(12) United States Patent
Theytaz et al.

(10) Patent No.: US 7,898,524 B2
(45) Date of Patent: *Mar. 1, 2011

(54) OPTICAL DISPLACEMENT DETECTION OVER VARIED SURFACES

(75) Inventors: Olivier Theytaz, Savigny (CH); Nicolas Sasselli, Lausanne (CH); Boris Karamata, Lausanne (CH); Nicolas Chauvin, Chexbres (CH)

(73) Assignee: Logitech Europe S.A., Morges (CH)

( * ) Notice: Subject to any disclaimer, the term of this patent is extended or adjusted under 35 U.S.C. 154(b) by 1111 days.

This patent is subject to a terminal disclaimer.

(21) Appl. No.: 11/471,084

(22) Filed: Jun. 20, 2006

(65) Prior Publication Data

US 2007/0008286 A1 Jan. 11, 2007

Related U.S. Application Data

(60) Provisional application No. 60/795,031, filed on Apr. 26, 2006, provisional application No. 60/749,996, filed on Dec. 12, 2005, provisional application No. 60/702,459, filed on Jul. 25, 2005, provisional application No. 60/696,023, filed on Jun. 30, 2005.

(51) Int. Cl.
*G06F 3/033* (2006.01)
(52) U.S. Cl. .................................................. 345/166
(58) Field of Classification Search .................. 345/166
See application file for complete search history.

(56) References Cited

U.S. PATENT DOCUMENTS

| | | | | |
|---|---|---|---|---|
| 3,661,465 | A * | 5/1972 | Groh | 356/389 |
| 4,364,035 | A | 12/1982 | Kirsch | |
| 4,647,771 | A | 3/1987 | Kato | |
| 4,734,685 | A | 3/1988 | Watanabe | |
| 4,751,505 | A * | 6/1988 | Williams et al. | 345/166 |
| 5,274,361 | A * | 12/1993 | Snow | 345/166 |
| 5,288,993 | A | 2/1994 | Bidiville et al. | |

(Continued)

FOREIGN PATENT DOCUMENTS

CN 1924774 A 3/2007

(Continued)

OTHER PUBLICATIONS

Bidiville, Marc "Pointing Device Utilizing a Photodetector Array", Unpublished U.S. Patent Application, U.S. Appl. No. 08/199,982, filed Feb. 18, 1994.

(Continued)

*Primary Examiner* — Bipin Shalwala
*Assistant Examiner* — Dorothy Webb
(74) *Attorney, Agent, or Firm* — The Law Office of Deepti Panchawagh-Jain

(57) ABSTRACT

Embodiments of the present invention enable an optical device to track on a diffusing surface over which a transparent and/or translucent and/or optically smooth surface is placed. Some embodiments are directed towards detecting when an optical device is lifted off the surface it was resting on. Embodiments also include a sensing system that detects the z distance (distance to the tracking surface) and improves image quality by improving the effectiveness of the optical sensor subsystem and/or the illumination subsystem at the detected z distance. Other embodiments include a system and method that enables an optical device to track on a transparent and/or translucent and/or optically smooth surface alone. This may involve dark-field imaging based on certain features (e.g., dirt) already present on the transparent surface. Alternately, this may involve creating features such as droplets, spreading dirt residue, and creating thermal spots, which can be used for tracking.

18 Claims, 26 Drawing Sheets

U.S. PATENT DOCUMENTS

| | | | | |
|---|---|---|---|---|
| 5,463,387 A | * | 10/1995 | Kato | 341/31 |
| 5,517,211 A | * | 5/1996 | Kwang-Chien | 345/166 |
| 5,578,813 A | | 11/1996 | Allen et al. | |
| 5,578,817 A | | 11/1996 | Bidiville et al. | |
| 5,644,139 A | | 7/1997 | Allen et al. | |
| 5,686,720 A | | 11/1997 | Tullis | |
| 5,703,356 A | | 12/1997 | Bidiville et al. | |
| 5,729,009 A | * | 3/1998 | Dandliker et al. | 250/208.2 |
| 5,776,585 A | * | 7/1998 | Fukuhara et al. | 428/141 |
| 5,786,804 A | | 7/1998 | Gordon | |
| 5,805,278 A | | 9/1998 | Danko | |
| 5,825,044 A | | 10/1998 | Allen et al. | |
| 5,854,482 A | | 12/1998 | Bidiville et al. | |
| 5,994,710 A | * | 11/1999 | Knee et al. | 250/557 |
| 6,084,574 A | | 7/2000 | Bidiville | |
| 6,124,587 A | * | 9/2000 | Bidiville et al. | 250/221 |
| 6,172,354 B1 | | 1/2001 | Adan et al. | |
| 6,175,357 B1 | | 1/2001 | Gordon | |
| 6,218,659 B1 | | 4/2001 | Bidiville et al. | |
| 6,281,882 B1 | * | 8/2001 | Gordon et al. | 345/166 |
| 6,330,057 B1 | * | 12/2001 | Lederer et al. | 356/28 |
| 6,380,927 B1 | | 4/2002 | Ostrum et al. | |
| 6,449,088 B1 | * | 9/2002 | Pettingell et al. | 359/386 |
| 6,462,330 B1 | | 10/2002 | Venkat et al. | |
| 6,603,111 B2 | | 8/2003 | Dietz et al. | |
| 6,621,483 B2 | | 9/2003 | Wallace et al. | |
| 6,657,184 B2 | * | 12/2003 | Anderson et al. | 250/221 |
| 6,697,053 B2 | | 2/2004 | Kajihara | |
| 6,707,027 B2 | * | 3/2004 | Liess et al. | 250/221 |
| 6,741,234 B2 | | 5/2004 | Son | |
| 6,769,769 B2 | | 8/2004 | Podoleanu et al. | |
| 6,934,037 B2 | | 8/2005 | DePue et al. | |
| 6,940,652 B2 | | 9/2005 | Tseng | |
| 7,019,733 B2 | | 3/2006 | Koay | |
| 7,071,920 B2 | | 7/2006 | Bohn | |
| 7,098,894 B2 | | 8/2006 | Yang et al. | |
| 7,116,427 B2 | * | 10/2006 | Baney et al. | 356/498 |
| 7,161,682 B2 | | 1/2007 | Xie et al. | |
| 7,189,985 B2 | | 3/2007 | Xie et al. | |
| 7,321,359 B2 | | 1/2008 | Xie et al. | |
| 7,339,575 B2 | | 3/2008 | Tai et al. | |
| 7,394,454 B2 | | 7/2008 | Kong | |
| 7,399,954 B2 | * | 7/2008 | Venkatesh | 250/221 |
| 7,439,954 B2 | | 10/2008 | Theytaz et al. | |
| 7,755,604 B2 | | 7/2010 | Trisnadi et al. | |
| 2002/0080121 A1 | * | 6/2002 | Son | 345/166 |
| 2002/0179823 A1 | | 12/2002 | Dietz et al. | |
| 2003/0112220 A1 | * | 6/2003 | Yang et al. | 345/156 |
| 2004/0036838 A1 | * | 2/2004 | Podoleanu et al. | 351/206 |
| 2004/0061680 A1 | * | 4/2004 | Taboada | 345/157 |
| 2004/0189593 A1 | * | 9/2004 | Koay | 345/156 |
| 2004/0227954 A1 | | 11/2004 | Xie | |
| 2005/0024623 A1 | | 2/2005 | Xie et al. | |
| 2005/0024624 A1 | | 2/2005 | Gruhlke et al. | |
| 2005/0035947 A1 | | 2/2005 | Lutian | |
| 2005/0057492 A1 | | 3/2005 | Bathiche et al. | |
| 2005/0073693 A1 | * | 4/2005 | DePue et al. | 356/499 |
| 2005/0156875 A1 | | 7/2005 | Kong | |
| 2005/0156876 A1 | | 7/2005 | Kong | |
| 2005/0179662 A1 | | 8/2005 | Gordon et al. | |
| 2005/0231482 A1 | | 10/2005 | Theytaz et al. | |
| 2006/0187208 A1 | | 8/2006 | Wenstrand et al. | |
| 2007/0013661 A1 | | 1/2007 | Theytaz et al. | |
| 2008/0158158 A1 | * | 7/2008 | Cheah et al. | 345/166 |
| 2009/0135140 A1 | | 5/2009 | Constantin et al. | |

FOREIGN PATENT DOCUMENTS

| | | |
|---|---|---|
| CN | 101063912 A | 10/2007 |
| CN | 101073047 A | 11/2007 |
| CN | 100530062 C | 8/2009 |
| DE | 10225661 | 1/2003 |
| DE | 69715074 | 5/2003 |
| DE | 69725021 T2 | 4/2004 |
| DE | 102006030260 A1 | 2/2007 |
| DE | 112005000701 T5 | 5/2007 |
| DE | 102008058759 A1 | 5/2009 |
| EP | 1081634 | 3/2001 |
| EP | 1182606 | 2/2002 |
| EP | 1255219 | 11/2002 |
| EP | 1255219 A1 | 11/2002 |
| EP | 1283493 | 2/2003 |
| EP | 1586857 A1 | 10/2005 |
| WO | 99/39304 | 8/1999 |
| WO | WO-9946603 A1 | 9/1999 |
| WO | 00/38103 | 6/2000 |
| WO | 00/57352 | 9/2000 |
| WO | WO-0235181 A1 | 5/2002 |
| WO | 2004151927 A | 5/2004 |
| WO | 2005/101171 A2 | 10/2005 |
| WO | 2005/101171 A3 | 5/2007 |

OTHER PUBLICATIONS

Bidiville, Marc "Pointing Device Utilizing a Photodetector Array", Unpublished U.S. Patent Application, U.S. Appl. No. 08/477,448, filed Jun. 7, 1995.

Bidiville, Marc "Pointing Device Utilizing a Photodetector Array", Unpublished U.S. Patent Application, U.S. Appl. No. 08/997,222, filed Dec. 23, 1997.

Hewett, Jacqueline "Optical mouse saves space", http://optics.org/cws/article/research/9217, (Jun. 26, 2002), 2 pages.

"Olympus Microscopy Resource Center", http://www.olympusmicro.com/primer/resources/digital.html, (Oct. 23, 2007), 5 pgs.

Born, Max et al., "Principles of Optics", http://books.google.com/books?id=oV80AAAAIAAJ&pg=PP1&dg=principles+of+optics&as_brr=0&sig=uQwXJbWH4-41tnzJia0b0a46_6Y#PPA948,M1, (2000), 3 pgs.

Goodman, Joseph W., "Introduction to Fourier Optics", http://books.google.com/books?id=ow5xs_Rtt9AC&pg=PP1&dq=introduction+to+fourier+optics&as_brr=0&sig=PyrY94OYAhloMKrVs-pDnZPVwiM#PPR13,M1, (2004), 4 pgs.

Stover, John C "Optical Scattering: Measurement and Analysis", *Second Edition*, (1995), 321 pages.

Bass, Michael "Handbook of Optics: Fundamentals, Techniques, & Design vol. I", *Second Edition*, (1995).

Office Action for Chinese Patent Application No. 200610091123.6, mailed on Nov. 2, 2007, 12 pages.

Office Action for Chinese Patent Application No. 200610091123.6, mailed on Jun. 13, 2008, 6 pages.

Office Action for Chinese Patent Application No. 200610091123.6, mailed on Oct. 17, 2008, 4 pages.

Office Action for German Patent Application No. 102006030260.5, mailed on Oct. 15, 2007, 7 pages.

Office Action for Chinese Patent Application No. 200710088276.X, mailed on Feb. 6, 2009, 1 page.

Office Action for Chinese Patent Application No. 200710088276.X, mailed on Aug. 15, 2008, 3 pages.

"Mouse & Keyboard Products", Wireless Optical Mouse 5000, Document Available at: http://www.microsoft.com/hardware/mouseandkeyboard/productdetails.aspx?pid=052, 2 pages.

"Mouse & keyboard Products", Trackball Optical, Document Available at: http://www.microsoft.com/products/info/product.aspx?view=10&pcid=10426173-9aba-45eb-b7ce-af9ef9724d3d&type=ovr, 2 pages.

"Mouse & Keyboard Products", Mouse Products, Document Available at: http://www.microsoft.com/hardware/mouseandkeyboard/technologies/optical.mspx, 2 pages.

Office Action for U.S. Appl. No. 10/826,424, mailed on Feb. 6, 2008, 22 pages.

Office Action for German Patent Application No. 112005000701.4, mailed on Feb. 11, 2008, 4 pages.

"International Preliminary Report on Patentability for PCT Application No. PCT/IB2005/001793 mailed on May 10, 2007", 16 pages.

International Search report for PCT Application No. PCT/IB2005/001793, mailed on Apr. 4, 2007, 6 pages.

Office Action for Chinese Patent Application No. 200580010487.0, mailed on Aug. 8 2008, 4 pages.

Office Action for Chinese Patent Application No. 200610091123.6, mailed on Sep. 13, 2006, 1 page.

Office Action for German Patent Application No. 112005000701.4, mailed on Jun. 29, 2009, 3 pages.
Non-Final Office Action for U.S. Appl. No. 11/522,834, mailed on Sep. 11, 2009, 32 pages.
Barkas, W. W., "Analysis of Light Scattered From a Surface of Low Gloss Into its Specular and Diffuse Components", May 23, 1938, pp. 274-295.
Office Action for Chinese Patent Application No. 200610091123.6, mailed on Jun. 17, 2009, 5 pages.
Office Action for Chinese Patent Application No. 200580010487.0, mailed on Sep. 11, 2009, 2 pages.
Office Action for Chinese Patent Application No. 200580010487.0, mailed on May 8, 2009, 3 pages.
Document available at: http://micro.magnet.fsu.edu/primer/techniques/darkfieldreflect.html, 7 pages.
Document available at: http://micro.magnet.fsu.edu/primer/java/darkfield/reflected/index.html, 2 pages.
Document available at: http://www.microsoft.com/hardware/mouseandkeyboard/tracklanding.mspx, 1 page.
Intellimouse Explorer, Document available at: http://www.microsoft.com/hardware/mouseandkeyboard/productdetails.aspx?pid=003, 1 page.
Optical Technology, Document available at: http://www.microsoft.com/hardware/mouseandkeyboard/technologies/optical.mspx, 2 pages.
Final Office Action for U.S. Appl. No. 11/522,834, mailed on Mar. 10, 2010, 31 pages.
Office Action for German Patent Application No. 1020080587591, mailed on Feb. 26, 2010, 5 pages of Office Action and 4 pages of English translation.
Office Action for German Patent Application No. 102006030260.5, mailed on Mar. 2, 2010, 4 pages of Office Action and 3 pages of English Translation.
Notice of Decision to Grant received for Chinese Patent Application No. 200580010487.0, mailed on Feb. 5, 2010, 2 pages.
Notice of Allowance for U.S. Appl. No. 10/826,424, mailed on Aug. 11, 2008, 6 pages.
Notice of Allowance for U.S. Appl. No. 11/522,834, mailed on Aug. 11, 2010, 14 pages.
Office Action Received for Chinese Patent Application No. 200710088276.X, mailed on Feb. 6, 2009, 1 page.
Office Action Received for Chinese Patent Application No. 200710088276.X, mailed on Aug. 15, 2008, 3 page.
"Mouse & Keyboard Products", Wireless Optical Mouse 5000, Document Available at: http://www.microsoft.com/hardware/mouseandkeyboard/productdetails.aspx?pid=052, 2 pages, dated: Apr. 9, 2009.
"Mouse & keyboard Products", Trackball Optical, Document Available at: http://www.microsoft.com/products/info/product.aspx?view=10&pcid=10426173-9aba-45eb-b7ceaf9ef9724d3d&type=ovr, 2 pages, dated: Dec. 9, 2009.
"Mouse & Keyboard Products", Mouse Products, Document Available at: http://www.microsoft.com/hardware/mouseandkeyboard/technologies/optical.mspx, 2 pages, dated: Apr. 9, 2009 .
Office Action Received for U.S. Appl. No. 10/826,424, mailed on Feb. 6, 2008, 22 pages.
Office Action Received for German Patent Application No. 112005000701.4, mailed on Feb. 11, 2008, 4 pages.
"International Preliminary Report on Patentability Received for PCT Application No. PCT/IB2005/001793 mailed on May 10, 2007", 16 pages.
International Search report Received for PCT Application No. PCT/IB2005/001793, mailed on Apr. 4, 2007, 6 pages.
Office Action Received for Chinese Patent Application No. 200580010487.0, mailed on Aug. 8 2008, 4 pages.
Office Action Received for Chinese Patent Application No. 200610091123.6, mailed on Sep. 13, 2006, 1 page.
Office Action Received for German Patent Application No. 112005000701.4, mailed on Jun. 29, 2009, 3 pages.
Non-Final Office Action Received for U.S. Appl. No. 11/522,834, mailed on Sep. 11, 2009, 32 pages.
Barkas, W. W., "Analysis of Light Scattered From a Surface of Low Gloss Into Its Specular and Diffuse Components", May 23, 1938, pp. 274-295.
Office Action Received for Chinese Patent Application No. 200610091123.6, mailed on Jun. 17, 2009, 5 pages.
Office Action Received for Chinese Patent Application No. 200580010487.0, mailed on Sep. 11, 2009, 2 pages.
Office Action Received for Chinese Patent Application No. 200580010487.0, mailed on May 8, 2009, 3 pages.
Document available at: http://micro.magnet.fsu.edu/primer/techniques/darkfieldreflect.html, 7 pages, dated: Dec. 7, 2009.
Document available at: http://micro.magnet.fsu.edu/primer/java/darkfield/reflected/index.html, 2 pages, dated: Dec. 7, 2009.
Document available at: http://www.microsoft.com/hardware/mouseandkeyboard/tracklanding.mspx, 1 page, dated: Dec. 9, 2009.
Intellimouse Explorer, Document available at: http://www.microsoft.com/hardware/mouseandkeyboard/productdetails.aspx?pid=003, 1 page, dated: Dec. 9, 2009 .
Optical Technology, Document available at: http://www.microsoft.com/hardware/mouseandkeyboard/technologies/ optical.mspx, 2 pages, dated: Dec. 9, 2009 .
Office Action from Geman App. No. 11 2005 000 701.4-53 dated Oct. 25, 2010, 5 pages including English and German documents.

* cited by examiner

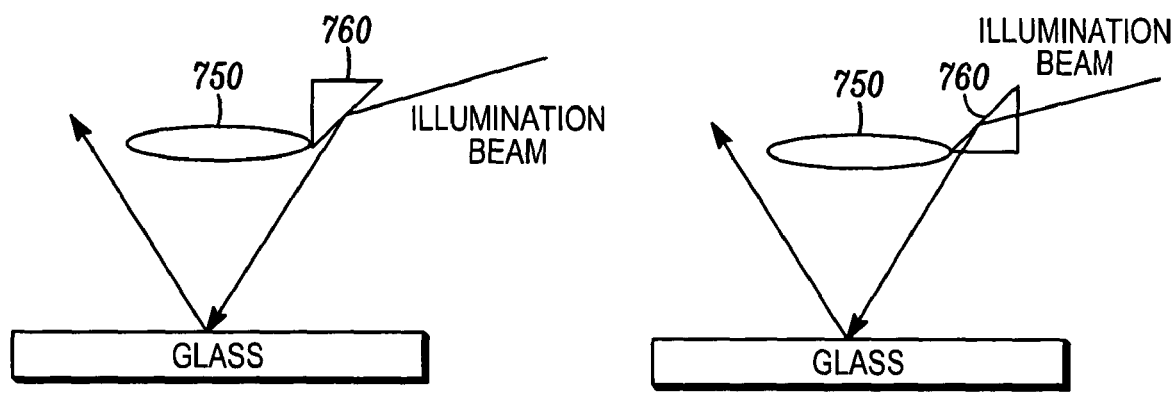
*FIG. 7B*   *FIG. 7C*

OPTICAL DISPLACEMENT DETECTION OVER VARIED SURFACES

CROSS-REFERENCES TO RELATED APPLICATIONS

This application claims priority to provisional application No. 60/795,031, which is entitled "An Input Device for Tracking on Varied Surfaces" and which was filed on Apr. 26, 2006. This application is hereby incorporated herein in its entirety.

This application claims priority to provisional application No. 60/749,996, which is entitled "Tracking on Varied Surfaces and Lift-Detection for an Input Device" and which was filed on Dec. 12, 2005. This application is hereby incorporated herein in its entirety.

This application claims priority to provisional application No. 60/702,459, which is entitled "Optical Displacement Detection on Transparent or Translucent Surfaces" and which was filed on Jul. 25, 2005. This application is hereby incorporated herein in its entirety.

This application claims priority to provisional application No. 60/696,023, which is entitled "Optical Displacement Detection over Surfaces of Various Depths" and which was filed on Jun. 30, 2005. This application is hereby incorporated herein in its entirety.

BACKGROUND OF THE INVENTION

1. Field of the Invention

The present invention relates generally to optical technology, and more particularly, to optical input devices.

2. Description of the Related Arts

Optical technology is used in many contexts, including optical input devices, such as a mouse. In most of these devices the optical system conventionally has a sensor for determining the displacement of the optical device relative to a surface. For example, in the case of an optical mouse, the mouse has at least one optical sensor to determine the movement of the mouse on a surface, such as a desktop or mouse pad. The movement of the mouse on the surface translates to movement of a mouse pointer or cursor on a display associated with a host.

The movement or displacement of an optical mouse is determined by comparing two different images captured at two different moments in time and possibly two different locations on the surface. The ability of an optical mouse to track is highly dependent on the quality of the images. If the images are good quality, the optical mouse can more easily track.

Sensors used in conventional optical mice can track on surfaces which are capable of diffusing light, such as paper, wood, paint, metal, and the like. This is because conventional imaging is based on using the optically rough nature of regular surfaces (e.g., wood, cloth, etc.). Thus, problems arise with imaging when the surface is made of optically smooth materials which do not diffuse a sufficient amount of light, such as a surface made of glass or other transparent material. An example of this is a glass table. In addition, problems also arise when a layer of glass or other transparent material is positioned on top of a diffusing surface. An example of this is a glass sheet placed on top of a wooden desk. Let us consider each of these situations separately.

When a surface made of a transparent material such as glass is to be used as a tracking surface, sufficient light is not diffused by the surface to make conventional tracking possible.

When a layer of glass or other transparent material is placed on top of a diffusing surface, such a configuration causes a change in the distance (referred to as the "z distance") between the optical sensor and the imaging surface, i.e., the diffusing surface beneath the transparent layer. Hence, conventional methods of illumination and imaging may result in improper focus, inadequate illumination, and/or spot shift or poor overlap of the illuminated spot and the imaged area. These problems can prevent the sensor from accurately tracking displacement (mouse motion).

Attempts to address some of these issues in conventional systems result in other short-comings. For example, a problem arises with accurate detection of lifts. In particular, when a user lifts the mouse, e.g., intending to reposition it on the tracking surface without moving the cursor on the screen, the cursor on the screen follows the movements of the mouse throughout the lift when, in fact, it should not do so.

Moreover, problems discussed above are not limited to optical input devices. Similar problems exist for other devices that use optical technology to capture images and determine location and movement. An example of another device that may experience such shortcomings is a handheld scanner.

Accordingly it is desirable to provide an optical device that can accurately track displacement relative to a surface, even when a layer of transparent material is placed between the optical device and the tracking surface or when the user desires to track only on a transparent material, as well as to provide accurate lift detection.

SUMMARY OF THE INVENTION

Embodiments of the present invention include a system and method that enables an optical device to track on a diffusing surface over which a transparent and/or translucent and/or optically smooth surface is placed. Other embodiments of the present invention include a system and method that enables an optical device to track on a transparent and/or translucent and/or optically smooth surface alone. Some embodiments of the present invention are directed towards detecting when an optical device is lifted off the surface it was resting on. Embodiments of the present invention also include a sensing system that detects the z distance (distance to the tracking surface) and improves image quality by improving the effectiveness of the optical sensor subsystem and/or the illumination subsystem at the detected z distance.

In accordance with some embodiments of the present invention, techniques for detecting z distance are provided when the tracking surface is beneath a transparent surface. In one embodiment, z distance is detected using collimated beam triangulation. A source of collimated light directs a light beam to a tracking surface beneath a layer of transparent material. Light is reflected at least from the tracking surface to a sensor. Based upon where the light beam intersects the sensor, the z distance can be determined. In an alternative embodiment, a slightly diverging source of light is used so that the illuminated spot increases in size as z-distance increases. Thus, the size of the illuminated spot can be used to determine z distance. In another embodiment, light wave interference is used to determine the distance to the tracking surface. In yet another embodiment, z distance is determined using a sensor comprising a line of charge coupled device (CCD) elements. The position where the reflected light from the tracking surface intersects the CCD line is used to determine the z distance.

In accordance with some embodiments of the present invention, techniques for improving image quality by improving the effectiveness of the optical sensor subsystem at various z distances are provided. In one embodiment, a small aperture is used in the optical sensor subsystem to increase the depth of the field of view, thus improving the image quality over a range of z distances. Alternatively, apertures of various small sizes or a variable size aperture is used to improve image quality. In one embodiment, a telecentric imaging system is used to improve image quality. According to another embodiment, multiple sensors are used, each sensor optimized for a respective range of z distances. Alternatively or additionally, an imaging system with autofocusing capabilities can be used. According to one embodiment, a variable shape lens is used to improve image quality.

In accordance with some embodiments of the present invention, techniques for improving image quality by improving the effectiveness of the illumination subsystem at various z distances are provided. In one embodiment, the amount of current used to power an illumination light source can be adjusted based on z distance. Alternatively or additionally, multiple light sources can be used, each light source optimized for illuminating a tracking surface at a respective range of z distances.

An optical device in accordance with some embodiments of the present invention detects when it is lifted off the surface on which it rests. In one embodiment, collimated beam triangulation can be used for this purpose. In one embodiment, a collimated laser beam creates a bright spot in the middle of the field of view of the imaging system. When the optical device is lifted off the surface, the spot moves laterally on the surface and thus the spot image moves in the image plane. Optical device lifts are detected when the spot lateral shift is larger than a specific distance on the sensor array. In another embodiment, a single small size detector of diameter D. In one embodiment, a lift results in not light being passed to the detector, and the drop in power indicates the lift (ON/OFF system). In yet another embodiment, a small aperture is used in place of, or in addition to the lens, in front of the detector for a similar result.

In accordance with some embodiments of the present invention, techniques for tracking on a transparent or translucent material are provided. In one embodiment, dark-field imaging is used to track dirt residuals on a transparent or translucent material. Light diffracted and scattered from the dirt residuals at diffraction orders exceeding the zero order is collected by a detector. In another embodiment an interferometric detection system is used for optical tracking on a transparent or translucent surface. A reference beam of light is superimposed on a detector with Doppler-shifted Rayleigh backscattered light from the transparent or translucent material. Digital signal processing is used to detect motion from the resulting signal.

Some of the embodiments of the present invention provide a method and system for creating features on an optically smooth surfaces (e.g., transparent or translucent surfaces such as glass) for purposes of tracking. Such features can be used in conjunction with dark-field imaging methods or conventional imaging methods. These embodiments include using water droplet dispensing systems, wiping the surface with some residue, spreading/enhancing dirt residue on the surface, and thermal spot tracking.

In some embodiments, droplets of water (or any other suitable fluid) are deposited on the glass surface by either sputtering (inkjet-like system) or evaporation (e.g. heating a porous material filled with water) followed by natural condensation. The concentration and size of the droplets could be controlled to a certain extent and greatly reduce the complexity of the detection system (optics and detector).

In other embodiments, a special dust cloth is used on the surface prior to mouse use. The dust cloth allows spreading solvent residual, silicone microbeads or any invisible marking agent.

In other embodiments, the mouse body contains some structures (e.g., a polymer ring) which contact the glass surface to spread dirt residuals already present on the glass surface. This will reduce the risk of having clean areas on which a dark-field system would not be able to track. In addition, the mouse may contain an element to provide additional dirt at optical level (visible to the sensor due to dark field).

In some embodiments employing thermal spot tracking, a focused laser beam is activated during a short time to heat the glass surface locally so as to create a hot spot. The latter is imaged on an IR detector array and serves as a reference for tracking. A new hot spot is created either when the hot spot is outside the field of view defined by the array size or when the hot spot temperature falls below a detection threshold (relative to the ambient temperature).

In one aspect of the present invention, two sub-systems are included in a device in accordance with an embodiment of the present invention. One of these sub-systems is used when the device is placed on an optically smooth surface, while another of these sub-systems is used when the device is placed on an optically rough surface.

The present invention may be applied to many different domains, and is not limited to any one application or domain. Many techniques of the present invention may be applied to an optical device in any domain. The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

The invention has other advantages and features which will be more readily apparent from the following detailed description of the invention and the appended claims, when taken in conjunction with the accompanying drawing, in which:

FIG. 7B illustrates how an illumination beam may be directed onto a surface in accordance with an embodiment of present invention.

FIG. 7C illustrates how an illumination beam may be directed onto a surface in accordance with another embodiment of present invention.

DETAILED DESCRIPTION OF THE INVENTION

The figures (or drawings) depict a preferred embodiment of the present invention for purposes of illustration only. It is noted that similar or like reference numbers in the figures may indicate similar or like functionality. One of skill in the art will readily recognize from the following discussion that alternative embodiments of the structures and methods disclosed herein may be employed without departing from the principles of the invention(s) herein. It is to be noted that although the following description of the preferred embodiments of the present invention is presented in the context of an optical mouse, there are other optical devices that can use the present invention such as, for example, an optical scanner, an optical digital writing system (e.g., Logitech IO pen by Logitech, Inc. of Fremont, Calif.), or an optical printer advance mechanism. Also, it is to be noted that the words "transparent" is sometimes used as a shorthand for referring to "transparent and/or translucent" in the following description.

Figure 1:
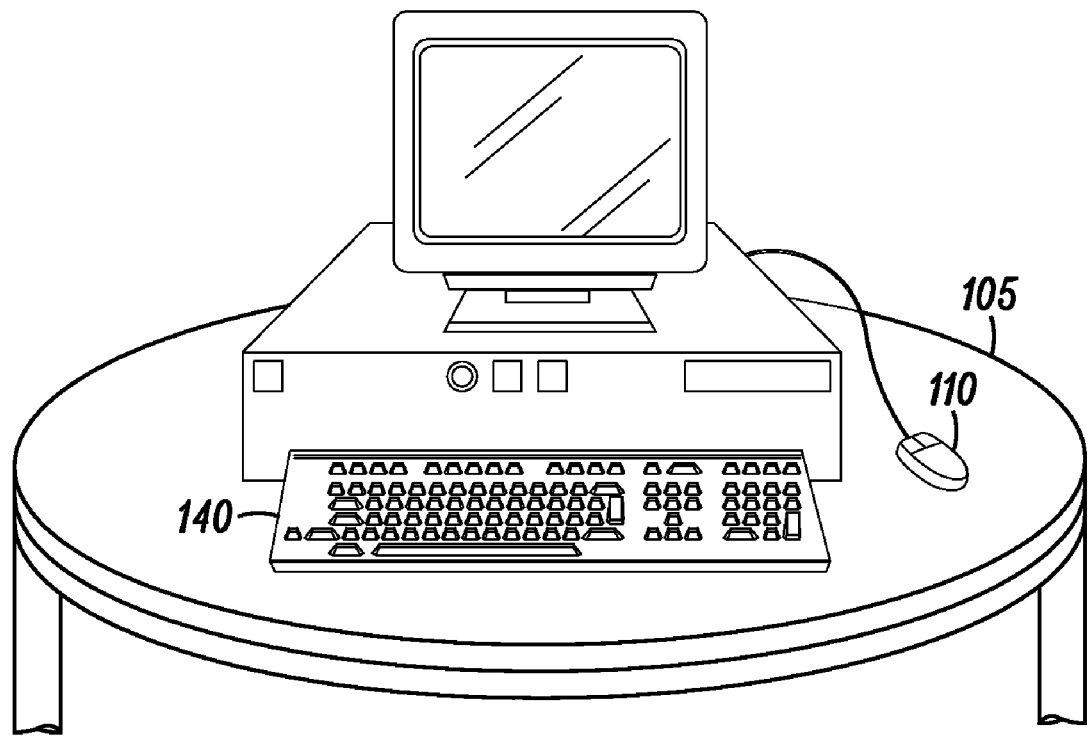
FIG. 1 is an illustration of a conventional computer system with an optical input device.

FIG. 1 shows a sample diagram of a conventional computer system 100 including two input devices, a keyboard 140 and an optical pointing device 110, resting on a working surface 105. One example of a pointing device 110 using optical displacement detection technology is an optical mouse. Examples of pointing devices using optical detection technology and their operation are described in U.S. Pat. No. 5,288,993 to Bidiville, et al. (issued Feb. 22, 1994) entitled "Cursor Pointing Device Utilizing a Photodetector Array with Target Ball Having Randomly Distributed Speckles" and U.S. Pat. No. 5,703,356 to Bidiville, et al. (issued on Dec. 30, 1997) entitled "Pointing Device Utilizing a Photodetector Array," the relevant portions of which are incorporated herein by reference in their entirety.

Figure 2:
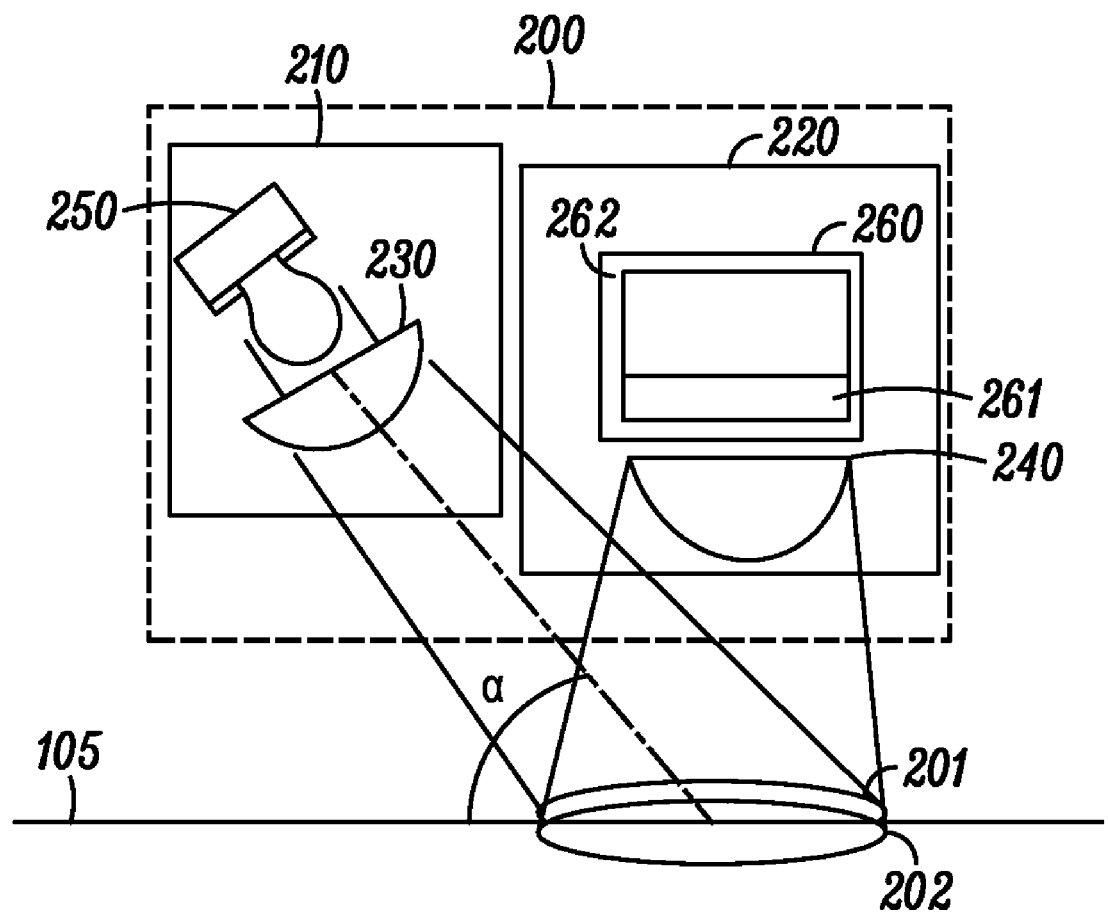
FIG. 2 is an illustration of a conventional optical displacement detection system of an optical input device.

FIG. 2 illustrates a conventional optical displacement detection system 200. The conventional optical displacement detection system 200, or optical system in general, includes a conventional illumination subsystem 210 and a conventional optical sensor or detection subsystem 220. The conventional illumination subsystem 210 includes a conventional illumination lens 230 and a conventional source of electromagnetic energy or light source 250. Typically, the light source 250 is a type of light emitting diode ("LED"), for example, a conventional red LED, a laser diode, or the like. Generally, the light source 250 is attached to a printed circuit board ("PCB") (not shown) and positioned with respect to the illumination lens 230 to direct light to an illumination spot 201 on a working or tracking surface 105 (e.g., a desk surface, pad, ball, or the like).

A conventional sensor subsystem 220 includes an imaging lens 240 and a sensor 260. The sensor 260 typically includes an image-capturing module 261, for example, one or more photosensor arrays. Some sensors 260 also include controller circuitry 262 associated with the image-capturing module 261, for example, in the form of digital circuits in the same die or device package. Generally, the controller circuitry 262 performs digital signal processing ("DSP") to derive movement data from the captured images. The sensor assembly 220 is also typically mounted on the PCB and positioned so that the imaging lens 240 optimally captures the electromagnetic energy (e.g., light) scattered from surface 105.

The area 202 of surface 105 that scatters electromagnetic energy is scanned or "imaged" by the sensor at any given time during normal operation is referred to as an imaged area 202.

It should be noted that although typically surface 105 is a flat surface, such as a mouse pad, table top, or the like it is not necessarily so. Surface 105 can be any surface, for example, a person's arm or hand, a sphere (as in a track ball pointing device), the arm of a chair or couch, or any other surface that can be placed in close proximity with the optical displacement detection system 200. The sensor analyzes the images scanned or taken of the surface 105 to provide displacement information. Preferably, the imaged area 202 substantially overlaps with the illumination spot 201 so that the light is efficiently used to illuminate only that area of the working surface 105 that is imaged or scanned by the sensor 260. However, due to misalignment and other mechanical tolerances in optical system components, illumination spot 201 is generally larger than the imaged area 202 to guarantee that enough electromagnetic energy is scattered towards the sensor 260.

The performance of an optical displacement detection system 200 depends on several factors. For example, good surface illumination and good image quality are important factors for the efficient performance of an optical input device 110. In addition, the alignment of all the components that contribute to the optical path in an optical detection system 200 is important for the optimal illumination of the imaged area 202, that is, the alignment between lenses, light source, and sensor is important for the optimal overlap of the illumination spot 201 with the imaged area 202 on the working surface 105. Co-pending U.S. patent application Ser. No. 10/122,488, filed Apr. 12, 2002, entitled "Attachment System for Use in an Optical Illumination System," which is commonly assigned to the assignee of the present invention and is incorporated herein by reference in its entirety, is directed to one embodiment of an improvement in component alignment.

Another performance factor is the quality of the image that reaches the image-capturing module 261. This in part depends on optical filtering of the light by the imaging lens and subsequent processing. For example, improvements in optical filtering and subsequent processing are provided by U.S. Pat. No. 6,256,016 (Jul. 3, 2001) to Piot et al., which is commonly assigned to the assignee of the present invention and is incorporated herein by reference in its entirety.

Similarly, the source of electromagnetic energy for the illumination subsystem 210 directly impacts the performance of the optical displacement detection system 200. One improvement in illumination systems 210, for example, is described in co-pending U.S. patent application Ser. No. 10/033,427 filed Dec. 27, 2001, entitled "An Optical Illumination System and Method," which is commonly assigned to the assignee of the present invention and is incorporated herein by reference in its entirety, and which is directed to an efficient illumination system that includes specialized lenses.

In some embodiments, the performance of optical displacement detection systems may be also affected by several illumination factors or characteristics of the illumination subsystems. For example, these factors or characteristics may include light wavelength, light beam impinging angle (shown as "α" in FIG. 2 representative of the median of the light beam, e.g., central ray), homogeneity of the light rays, and intensity. These illumination characteristics affect performance differently depending on the surface 105 of operation. Generally, the higher the intensity of the light source 250, the better the system can perform. However, light intensity directly impacts power consumption of the optical system. In systems in which the power supply is limited, e.g., battery operated systems, it is desirable to minimize the power consumption. Consequently, the intensity of the light source 250 must be commensurate with the performance increase it provides. Improvements in displacement detection based on multi-light source illumination subsystems are described, for example, in co-pending U.S. patent application Ser. No. 10/826,424 filed Apr. 15, 2004, entitled "Multi-Light-Source Illumination System For Optical Pointing Device," which is commonly assigned to the assignee of the present invention and is incorporated herein by reference in its entirety.

Various aspects of the present invention are directed to tracking on an optically rough surface (e.g., wood, conventional mouse pads etc.), while this optically rough surface is beneath some transparent material (e.g., a wooden table with a sheet of glass on it). Other aspects of the present invention are directed towards tracking on transparent surfaces (e.g., a table made of glass). Let us discuss these in turn.

Figure 3A:
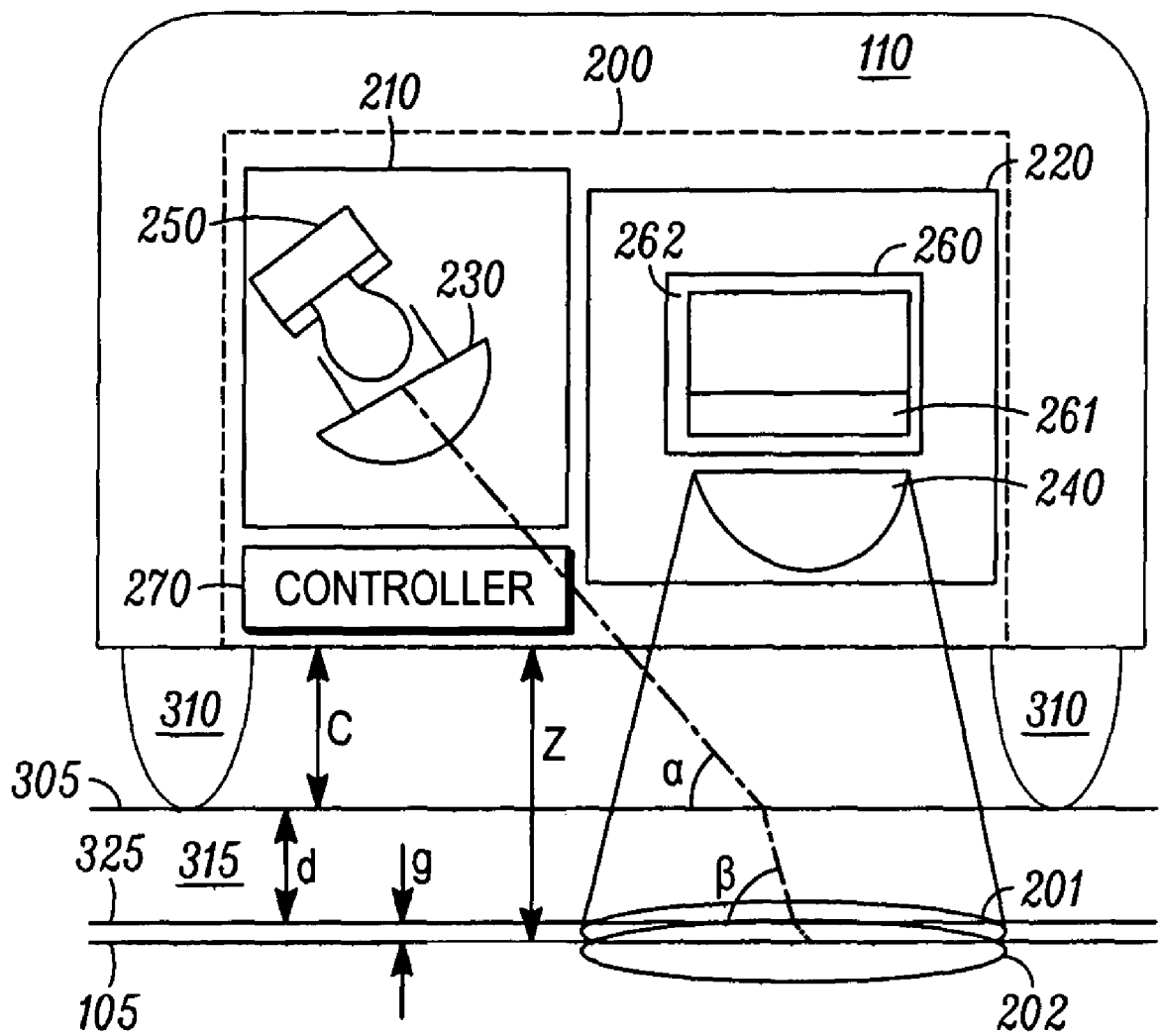
FIG. 3A is an illustration of one embodiment of an optical displacement detection system of an optical input device separated from a tracking surface by a layer of transparent material in accordance with the present invention.

Tracking on an Optically Rough Surface, when a Transparent Material is Placed Between the Optical Device and the Tracking Surface As mentioned above, in some environments, an optical input device may be placed on the surface of a transparent or translucent layer that overlays a tracking surface. This alters the distance between the optical displacement detection system and the tracking surface. FIG. 3A is an illustration of one embodiment of an optical displacement detection system of an optical input device separated from a tracking surface by a layer of transparent material in accordance with the present invention. Optical displacement detection system 200 is inside of an optical input device 110. As shown in FIG. 3A, the feet 310 of the optical input device 110 rest on the top surface 305 of a transparent layer 315 overlaying a tracking surface 105. Feet 310 are shown to have a height, c, which represents the clearance distance between top surface 305 on which the optical device 310 is resting and the bottom of the optical input device 110. Feet 310 are optional, and are not present in one embodiment. Thus, c can range from 0 to several millimeters ('mm') or more in one embodiment.

Transparent layer 315 is shown in FIG. 3A to have a thickness, d, which can range up to several centimeters ("cm"), for example 3 cm, in one embodiment. Transparent layer 315 may be transparent or translucent glass, plastic, or any material that allows light from light source 250 to travel through it to the underlying tracking surface 105 and back to sensor 260. For example, in one embodiment, an infrared light source is used over a black glass layer covering a wood surface. FIG. 3A also shows a gap of distance, g, between the bottom surface 325 of transparent layer 315 and the tracking surface 105. Gap g can range from 0 mm to several cm or more in one embodiment. In sum, a value z represents the total distance between the bottom of the optical input device 100 and the tracking surface 105, which includes the clearance distance c, the thickness of the transparent layer d, and the amount of the gap g (which is basically air).

In this example, light from light source 250 passes through illumination lens 230 to become incident on the top surface 305 of the transparent layer 315 at angle α. The light from light source 250 then passes through the transparent layer 315, traveling at angle β, then through the gap distance g to illumination spot 201 of tracking surface 105. If the gap is an air gap between transparent layer 315 and tracking surface 105, then the light exits the transparent layer 315 at angle α. Light is reflected from tracking surface 105, back through transparent layer 315 to sensor 260. Note that due to the index of refraction of the transparent layer and Snell's Law, light traveling through the transparent layer bends upon entry and exit, resulting in the illuminated spot 201 and the imaged area 202 occurring in a different location than they would occur without the presence of the transparent layer 315. Also, light from light source 250 travels at an acute angle α with respect to the surface of the transparent layer 305 and at acute angle β through the transparent layer to the tracking surface 105. Thus, greater the z distance, the farther away the illuminated spot occurs laterally from the light source 250. In addition, because the angle α is smaller than the angle β, the greater the distance between the top surface 305 and the bottom of the optical input device 110 as compared to the thickness of the transparent layer 305, the farther away the illuminated spot occurs laterally from the light source 250. These factors contribute to what is referenced as "spot shift".

As mentioned above, the accuracy of tracking is influenced by the quality of the image received by sensor 260. The quality of the image captured is dependent in part on the effectiveness of both the sensor subsystem 220 and illumination subsystem 210 at various heights over the tracking surface The following section describes techniques for detecting the height over the tracking surface. Improvements to the sensor subsystem 220 and the illumination subsystem 210 for use at various heights over the tracking surface in accordance with some embodiments of the present invention will be described in separate sections below.

Height Detection

In one embodiment, detection of the distance between the optical input device and the tracking surface, known as "z detection" or "height detection", may be accomplished using any conventional z-gage. For example, some conventional z gages use infrared beams reflected off the tracking surface to determine height. Other z gages are known to those of ordinary skill in the art. In one embodiment, z distance detection is integrated into the optical sensor subsystem 220 and/or the illumination subsystem 210. Alternatively, z distance detection is implemented within the optical device, but separate from these subsystems.

Figure 4A:
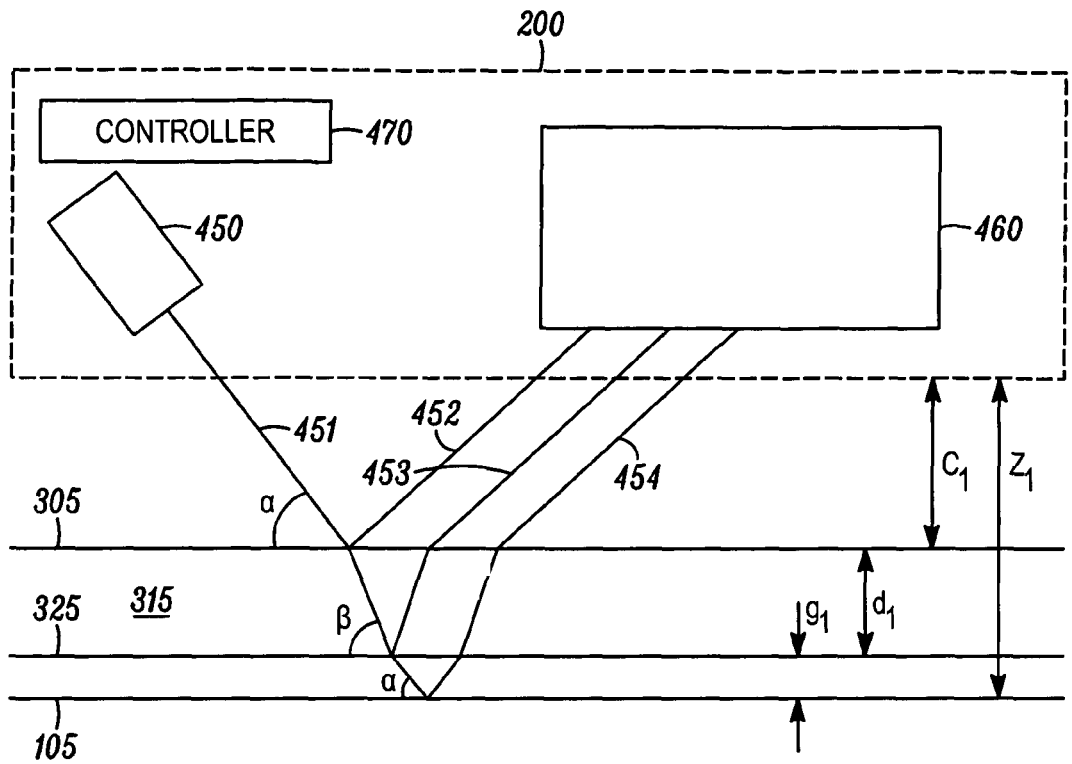
FIG. 4A is an illustration of one embodiment of an optical displacement detection system with a collimated light source directing light to a tracking surface under a layer of transparent material in accordance with the present invention.

Collimated Beam Triangulation. Referring now to FIG. 4A, there is shown an illustration of one embodiment of an optical displacement detection system 200 with a collimated light source 450, such as a laser, directing light to a tracking surface 105 under a layer of transparent material 315 in accordance with the present invention. Some portions of the illumination subsystem and sensor subsystem of the optical displacement detection system 200 are omitted for purposes of clarity. As also shown in FIG. 4A, sensor 460 receives light:

(i) reflected from the top surface 305 of the transparent layer 315,
(ii) reflected from the bottom surface of the transparent layer 325, and
(iii) diffused from the tracking surface 105.

Other multiple reflections also exist, but these are of low energy.

Figure 4B:
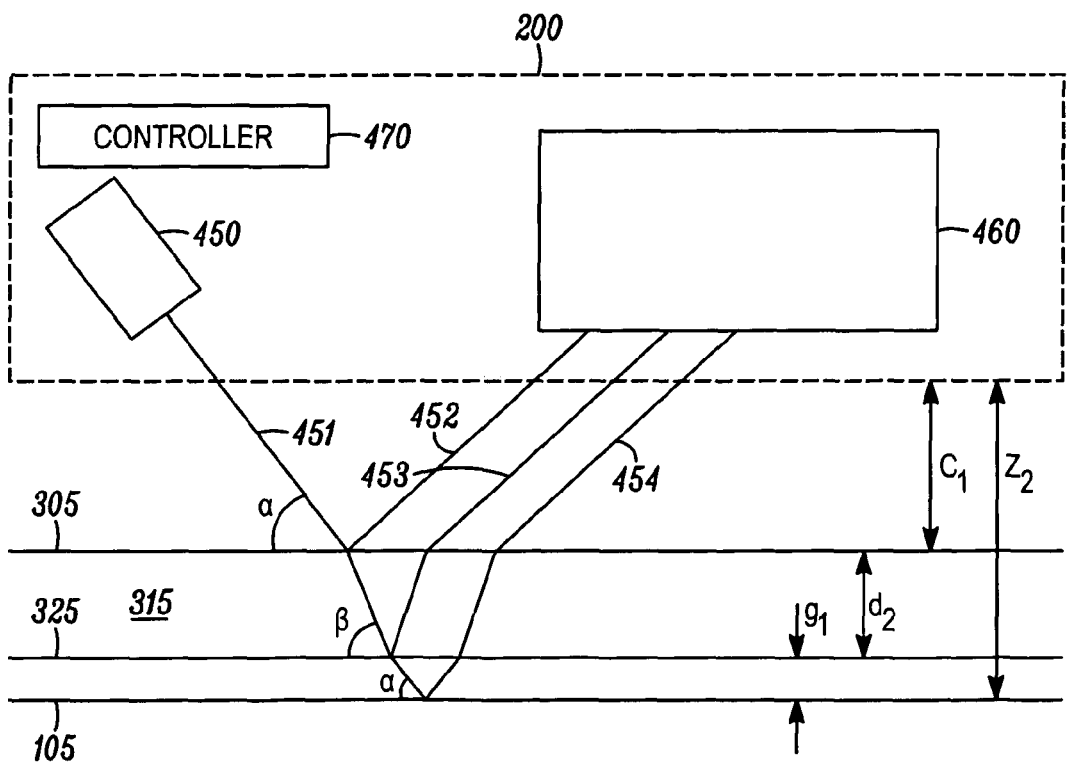
FIG. 4B is an illustration of one embodiment of an optical displacement detection system with a collimated light source directing light to a tracking surface under a thicker layer of transparent material than the layer illustrated in FIG. 4A in accordance with the present invention.

In one embodiment, reflected light from one or more of these surfaces is not received by sensor 460. A collimated beam of light 451, such as laser light, for example, is directed at an acute angle α toward tracking surface 105, and the light continues at an acute angle β through the transparent layer 315. Thus, the locations where the reflected light beams intersect the sensor 460 depend on the distances c, d, and g. Referring now to FIG. 4B, there is shown the same configuration of components as in FIG. 4A. However, in FIG. 4B transparent layer 315 is thicker, which is shown as a thickness of $d_2$ where $d_1 < d_2$. Distances g and c remain the same between FIG. 4A and FIG. 4B. Hence, $z_1 < z_2$. Note that as the z distance increases, the location of intersection of at least reflected beam 454 with sensor 460 moves away from collimated light source 450. The position of the intersection points of the reflected beams 452, 453, 454 can be used to determine distances c, d, g, and z using triangulation. In one embodiment, the collimated light source 450 is configured for use in z detection. In another embodiment, the collimated light source 450 is configured for use as the light source for illuminating the tracking surface 105 for imaging purposes. In another embodiment, the collimated light source 450 is configured for use as the light source for illuminating the tracking surface 105 for imaging purposes, and for use in z detection.

Those skilled in the art will appreciate that the above described triangulation technique can also be used to detect the distance c over a transparent layer and thickness d of the transparent material without an underlying tracking surface. For example, these techniques can be used to determine c and d for a layer of glass without a diffusing material placed underneath. In another embodiment, these techniques can also be used to determine whether the optical device is placed on a diffusing surface or on a transparent surface on top of a diffusing surface.

In an alternative embodiment, multiple sources of collimated light are used to cover different z ranges. For example, if a sensor 460 is of a fixed position with respect to collimated light source 450, certain distances z would prevent one or more of the reflected light beams 452, 453, 454 from intersecting the sensor 460. Thus, multiple sources of collimated light may be positioned, for example at different angles, for optimum illumination of the imaging surface at different distance ranges. A controller such as controller 470 can be used to control which light source is active. By analyzing the resulting image quality received by sensor 460, controller 470 can determine the best light source for the particular z distance.

In one embodiment, a collimated beam is spatially superimposed on an illumination spot illuminated by another light source. In an alternative embodiment, interference between the superimposed light sources is reduced by multiplexing the light source activation in time. For example, a controller such as controller 470 can alternate between activating the collimated light source for z detection and the light source for illuminating the imaged area.

In another embodiment, the light is not precisely collimated, but instead is slightly diverging. Thus, z distance can be determined based on the size of the spot where the reflected beam 454 intersects the sensor 460 in addition to or instead of the position of the spot. A larger spot size corresponds to a greater z distance. This technique can also be used in combination with the collimated light source techniques described above.

Interferometric signal. In another embodiment, z distance detection can be accomplished using interferometric techniques. An interferometer uses the phenomenon of wave interference to detect distances. Even conventional interferometers can be used to detect z distances. An interferometer can be embedded in the main sensor 460 or be a separate subsystem within the optical displacement detection system.

CCD Line. In one embodiment, sensor 460 in FIGS. 4A and 4B comprises a conventional charge coupled device (CCD). The CCD elements form a line that is intersected by reflected light beams 452, 453, 454. Thus, the location of the spot or spots of reflected light is used for z distance detection.

In one embodiment, a simple mechanical plunger gauge can also be used for height detection.

Lift Detection

In some embodiments, the optical device may be lifted above the surface, and it is often important to know when the optical device is in air. Certain conventional methods of lift detection rely on an image to become unfocused in order to register a lift. This technique may not produce accurate results. For example, a relatively small lift from the surface may result in the imaged area 202 still remaining in focus, particularly when a small aperture is used to obtain a longer depth of field. Thus, in one embodiment, by detecting a change in the distance between the optical mouse and the tracking surface the present invention can register a lift. Hence, the above described methods of z detection can also be used to detect changes in z distance which correspond to lifts of the optical device from a surface. In yet other embodiments, different conventional methods of lift detection can be used, e.g., pressure sensitive switches on the bottom of the optical input device.

Figure 19:
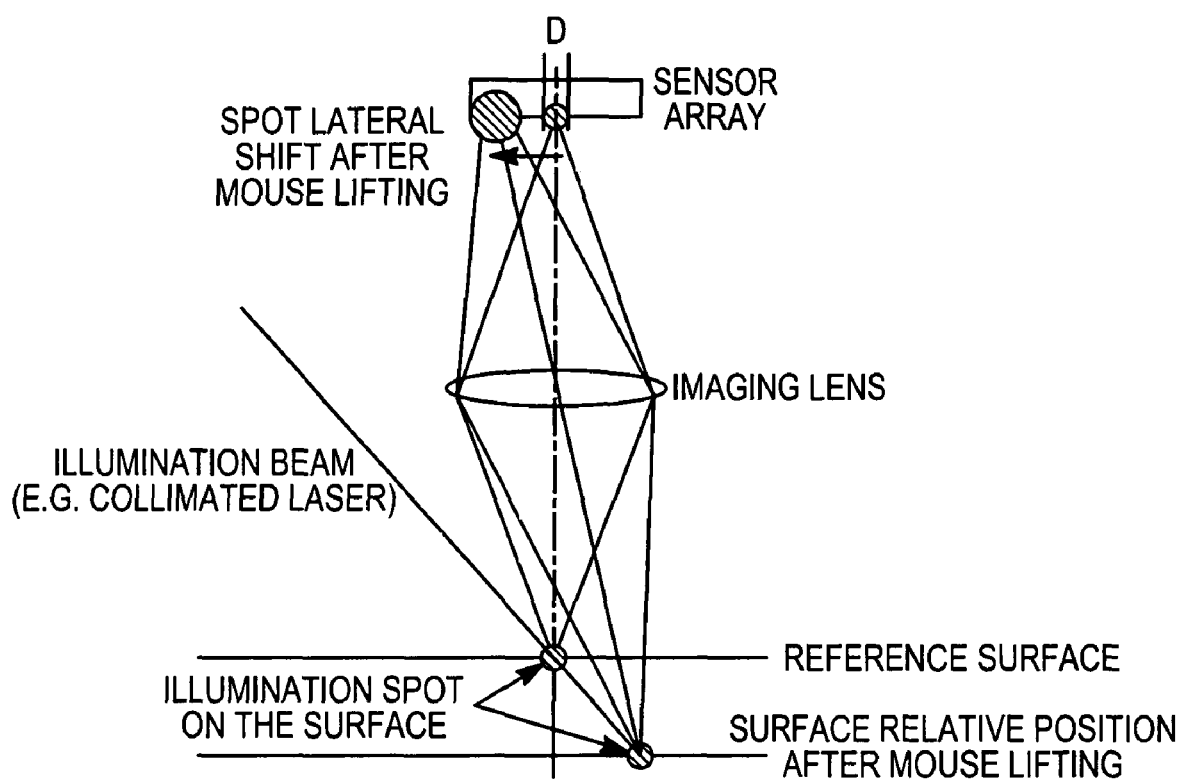
FIG. 19 illustrates lift detection using collimated beam triangulation in accordance with an embodiment of the present invention.

FIG. 19 illustrates how, in one embodiment, collimated beam triangulation can be used for purposes of detecting when an input device is lifted from a surface. The surface under discussion here could be an optically rough surface (e.g., wood, paper, etc.), or an optically smooth surface (e.g., glass). Alternately, the surface could be an optically rough surface under an optically smooth surface (e.g., a wooden desk covered by a glass sheet).

In one embodiment, a collimated laser beam creates a bright spot in the middle of the field of view of the imaging system. As shown in FIG. 19, when the optical device is lifted off the surface, the spot moves laterally on the surface and thus the spot image moves in the image plane. When out of focus, the laterally displaced spot is blurred.

Optical device lifts are detected when the spot lateral shift is larger than a specific distance on the sensor array (which, in one embodiment, can be linear). In on embodiment, this specific distance is predetermined. In one embodiment, a magnification factor G<1 may be used to reduce the range of the lateral shift (i.e. the size of the detector array).

Another efficient and simple way to detect the image spot lateral displacement is the use of a single small size detector of diameter D (see FIG. 19) or pinhole in front of a detector (on the optical axis). In one embodiment, a lift results in not light being passed to the detector, and the drop in power indicates the lift (ON/OFF system).

In one embodiment, a simple switch placed under one of the feet of a mouse could provide an indication of when the mouse is lifted.

Illumination Subsystem

In one embodiment, better image quality can be obtained by changing the intensity of the illumination of the tracking area. In one embodiment, illumination of the tracking area is increased by increasing the current to a single light source. Referring back to FIG. 3A, controller 270 can be used control the current to the light source 250. Controller 270 may receive input from a z distance detection system of the optical device. Because greater intensity of light is needed to adequately illuminate a tracking surface 105 below a thicker layer of transparent material 315, controller 270 can be configured to increase the current to light source 250 for greater z distances.

Figure 5:
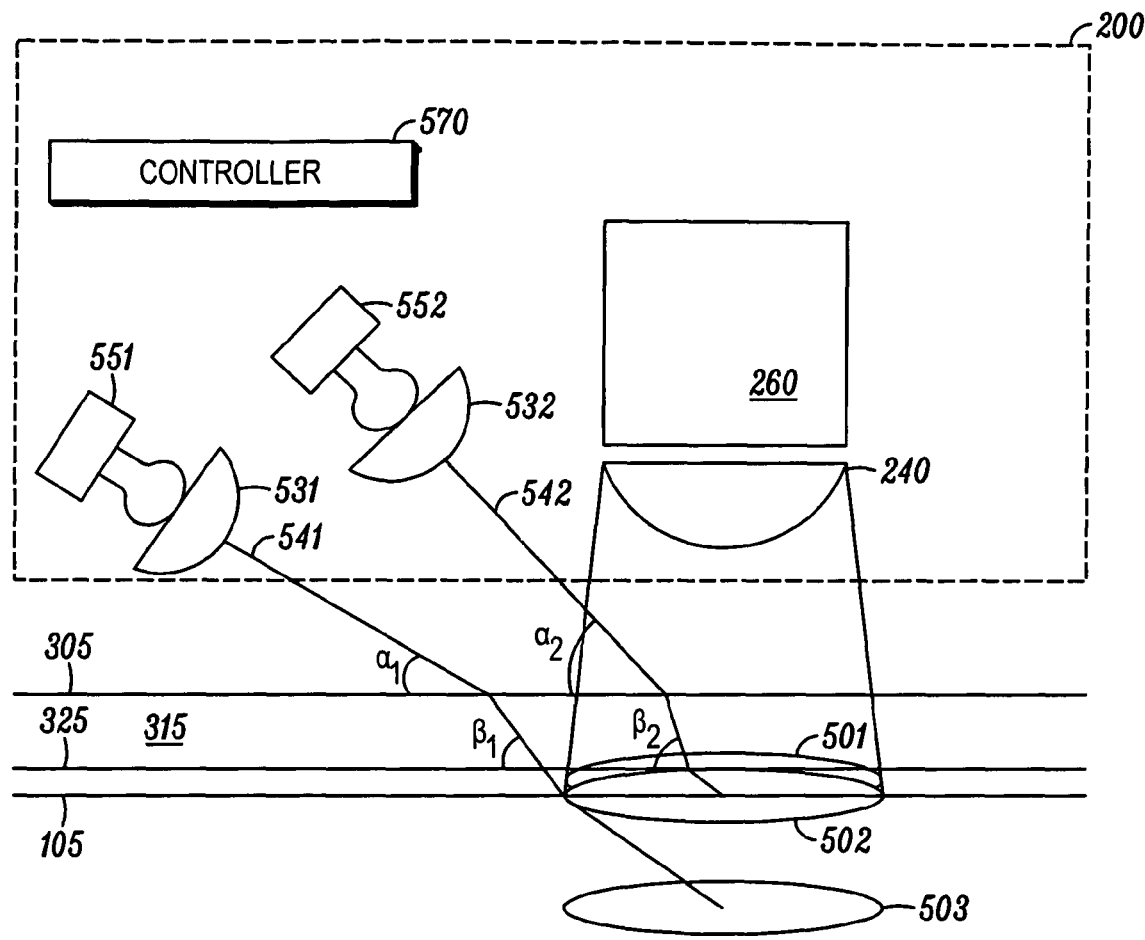
FIG. 5 is an illustration of one embodiment of an optical displacement detection system having two separate light sources, each light source configured to illuminate a tracking surface under a different range of thicknesses of transparent material in accordance with the present invention.

In alternative embodiments, multiple light sources are used to improve illumination of a tracking surface at different z distances. For example, FIG. 5 shows an illustration of one embodiment of an optical displacement detection system having two separate light sources, each light source configured to illuminate a tracking surface under a different range of thicknesses of transparent material in accordance with the present invention. Light from light source 551 travels to the surface of the transparent layer 305 at angle $\alpha_1$, and travels through transparent layer 315 at angle $\beta_1$. Light from light source 552 travels to the surface of the transparent layer 305 at an angle $\alpha_2$ and travels through transparent layer 315 at angle $\beta_2$. The illumination spot 501 of light source 552 overlaps with the imaged area 502 of tracking surface 105. Light source 551 is positioned to illuminate an area 503 at a greater z distance from sensor 260. Controller 570 can be used to control the activation of the light sources 551, 552, for example, so that only one light source is active at a time. Alternative methods of illuminating the imaging area are described in co-pending U.S. patent application Ser. No. 10/826,424 filed Apr. 15, 2004, entitled "Multi-Light-Source Illumination System For Optical Pointing Device," which has been incorporated herein by reference in its entirety.

Sensor Subsystem

With an understanding of various embodiments for detecting the height of the optical input device over the tracking surface in accordance with the present invention, reference will now be made to a system and a method for improving the image quality at predetermined heights through improvements to a conventional sensor subsystem. For example, embodiments of the present invention also provide several methods for improving image quality over a variety of z distances by altering the sensor subsystem 220.

Image quality can be enhanced through systems that allow for modifications to aperture or lens configuration or sensor configuration within the sensor subsystem. Examples of such configurations are noted herein.

Figure 3B:
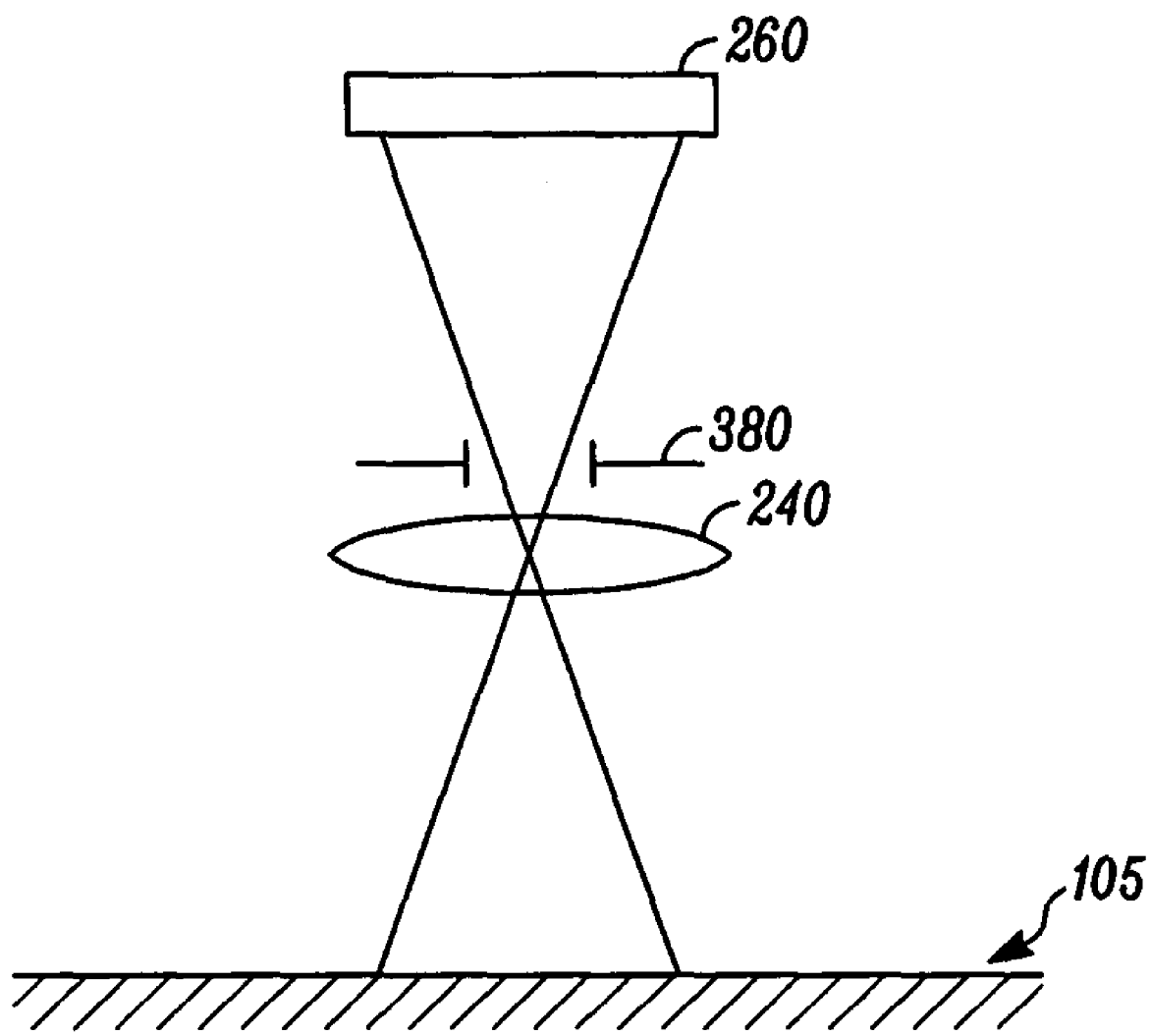
FIG. 3B is an illustration of a lens with an aperture.

Smaller aperture. Referring back to FIG. 3A, in one embodiment, lens 240 is replaced by an aperture or an aperture and lens combination such that light reflected from tracking surface 105 must pass through the aperture 380 to reach sensor 260. This can be seen in FIG. 3B. (For the sake of clarity, the transparent surface is not shown in FIG. 3B). An aperture of a fixed small size increases the depth of the field. Thus, surfaces at a greater range of distances appear in focus. The smaller the aperture, the greater the depth of the field but the less the intensity. Hence, in this embodiment, imaging of a surface below a transparent layer of various thicknesses d and with various gap distances g is possible provided that the total distance z is within the range of distances that appear in focus.

Variable size aperture. In one embodiment, lens 240 is replaced by an aperture or an aperture and lens combination where the aperture is of a variable size. In one embodiment, apertures of different sizes are able to be placed in front of sensor 260. For example, different size apertures may be present on a disk that can rotate in front of sensor 260 so as to use one aperture at a time. Controller 270 can be configured to control which aperture of the disk is used. Alternatively, one aperture could be used that is capable of changing size. In this case, controller 270 can be configured to control the size of the aperture.

It is noted that in both the small aperture and the variable size aperture embodiments, the smaller the size of the aperture, the more the loss of energy. To overcome the energy loss, the intensity of the illumination can be increased by increasing the power applied to the light source 250. In one embodiment, controller 270 controls the intensity of the light emitted by light source 250. Alternatively or additionally, different light sources with different intensities may be paired with different size apertures. In these embodiments, controller 270 can determine which light source is turned on.

Telecentric imaging system. In one embodiment, lens 240 is replaced with a telecentric lens system. A telecentric lens system is a configuration where, by design, the exit pupil is positioned at infinity. Consequently, the optical imaging system is not sensitive to the object positioning up to some extent. In one embodiment, the telecentric imaging system is designed to adequately image tracking surface 105 for z distances that range between 0 and 10 mm. Within the depth of field of a telecentric lens, a telecentric lens will show almost no magnification error. The size of the image does not change with distance. However, the imaged area shifts, so the illumination spot must also shift accordingly. In addition, a telecentric imaging system transmits less energy to sensor 260. Thus, greater intensity light or different or additional light sources can be used to improve the image received at sensor 260.

Figure 6:
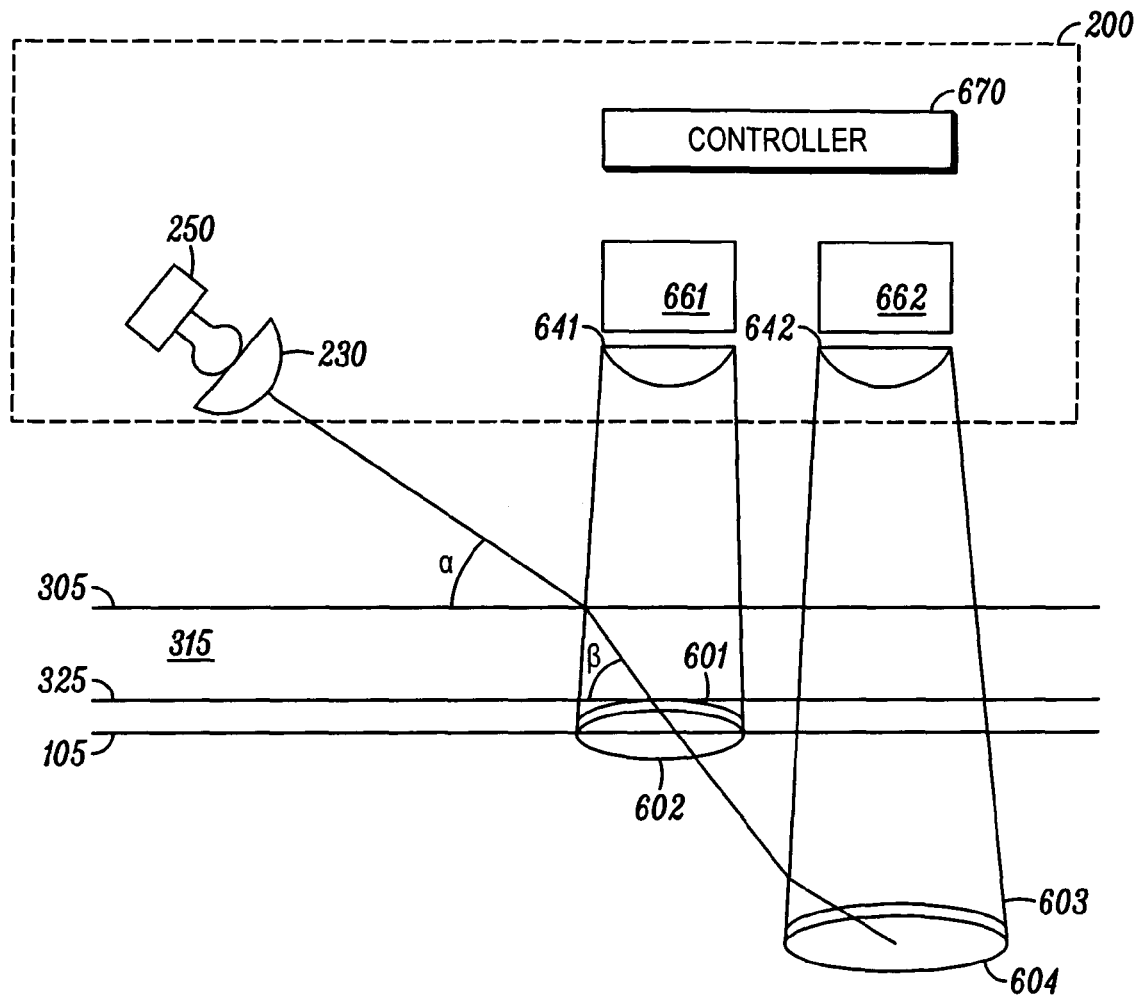
FIG. 6 is an illustration of one embodiment of an optical displacement detection system having two separate sensors, each sensor configured to image a tracking surface under a different range of thicknesses of transparent material in accordance with the present invention.

Multiple sensors. Referring now to FIG. 6, there is shown an illustration of one embodiment of an optical displacement detection system 200 having two separate sensors 661, 662, each sensor configured to image a tracking surface 105 under a different range of thicknesses of transparent material 315 in accordance with the present invention. In other embodiments, more than two sensors are used. Each sensor 661, 662 is optimized for a different range of distances. In the example shown in FIG. 6, sensor 661 is configured to focus on image area 601 which is at a depth appropriate to image tracking surface 105. Sensor 662, however, is configured to focus on image area 604 which would be appropriate for a much thicker layer of transparent material 315. In one embodiment, controller 670 is configured to select among the sensors based on which sensor provides the best image characteristics, such as contrast, resolution, or the like.

Autofocus system. In one embodiment, the sensor subsystem changes the lens used to focus the image until the image received at the sensor is optimized, i.e., the best image characteristics are obtained. Alternatively, the sensor subsystem can be configured to be responsive to z distance. Thus, the result of a z distance determination obtained using one of the above described techniques can be used as an input to the sensor subsystem for use in determining the appropriate lens. Once best focus is found, then the illumination subsystem can be used to optimize illumination of the tracking surface as described below.

Variable shape imaging lens. In one embodiment, variable shape lenses are used in the sensor subsystem. For example, certain lenses have optical properties that can be altered by applying an electric field to change the properties of the lens, for example lengthening or shortening the focal distance. Thus, electrical fields of increasing or decreasing strength can be applied to a variable shape lens until the image received at the sensor is optimized. A variable shape imaging lens provides auto-focus. Voice coils, stepper motor, and piezo are also techniques used to move an optical element in an autofocus system.

The above discussion relates to optical tracking on diffusing surfaces at various depths below a transparent or translucent layer of material. In some environment, no diffusing surface is within range of the optical sensors beneath a transparent or translucent layer. The next section describes embodiments of the present invention that have the capability to track on a transparent or translucent layer of material without the need for a diffusing surface placed beneath the material.

Tracking on a Transparent Surface

In one embodiment, dark-field imaging is used to track displacement of an optical device on a transparent and/or translucent surface. In one embodiment, dark-field imaging refers to imaging using the light diffused by certain features on the transparent surface. Only light that has been diffracted, refracted and reflected from the features (e.g., dirt, particles, etc.) is able to enter the lens to form an image. In the absence of such features, the viewfield appears totally back, because no light is reflected or diffracted into the objective. Additional information on dark-field imaging can be found in "Reflected Darkfield Illumination" and in "Catadioptric Darkfield Reflected Light Objectives" in the Molecular Expressions Optical Microscopy Primer Specialized Techniques, which are hereby incorporated by reference herein.

In some embodiments, these features may naturally be present on the transparent surface. For instance, even a relatively clean glass surface will often have some specks of dirt, residue from fingerprints etc. on it. In other embodiments, such features may be deposited on a transparent surface. Each of these situations is discussed below.

Figure 7A:
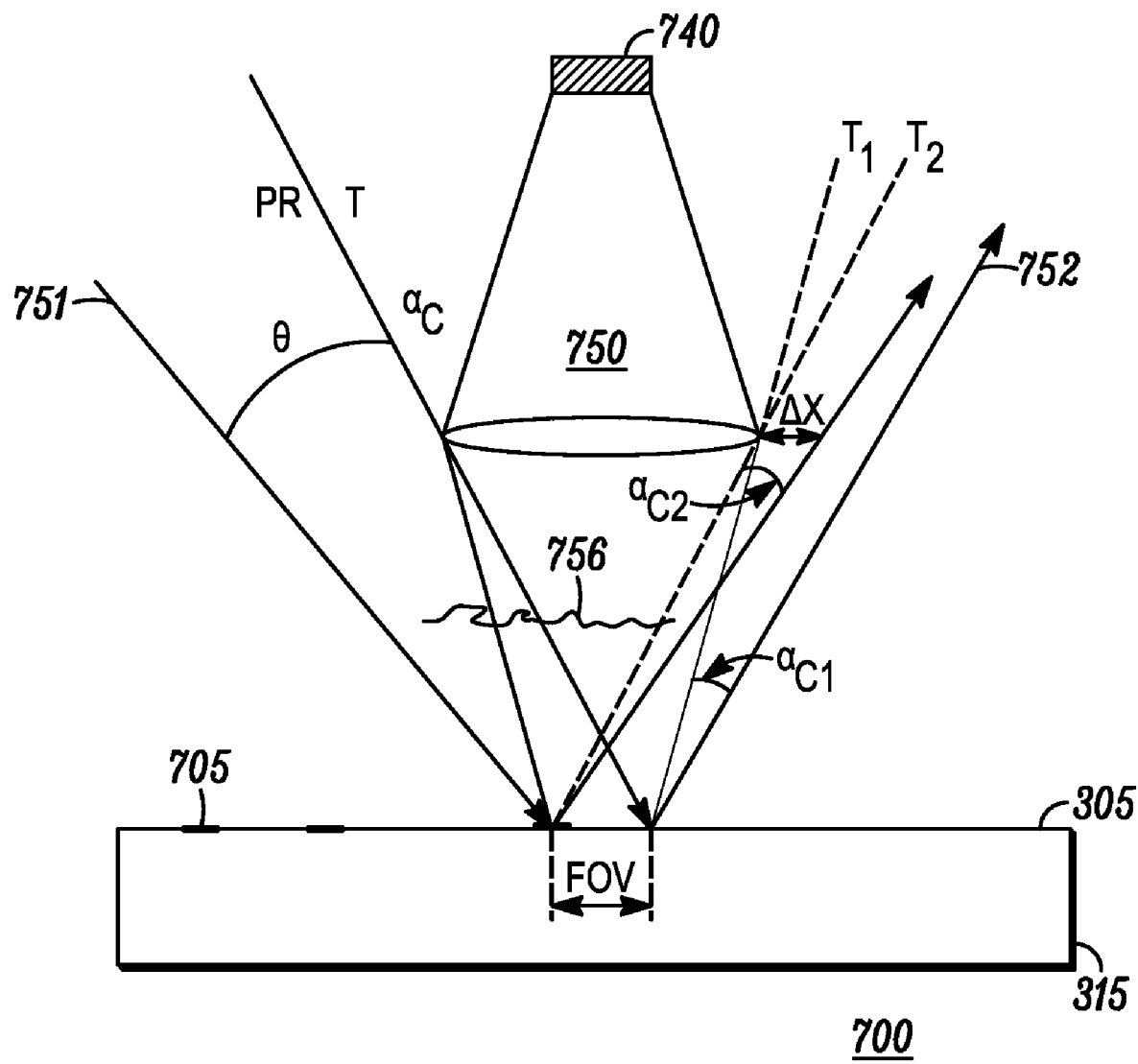
FIG. 7A is an illustration of one embodiment of an optical displacement detection system using a dark-field imaging system, in accordance with the present invention.

Using Naturally Present Features for Dark-Field Imaging:

FIG. 7A illustrates one embodiment of a dark-field imaging system 700. The dark-field imaging system 700 includes light 751 from at least one light source (not shown) directed toward a surface 305 of a transparent material 315, such as glass. In one embodiment the transparent material 315 has dirt residuals 705 on the surface 305, for example, oily or greasy residue from fingerprints or solvent residuals. As shown in FIG. 7A, light 751 is directed to the surface 305 of a transparent layer 315 which results in the reflected light 752 not being collected by detector array 740 through the imaging lens 750. In other words, the reflected light 752 (i.e., the zero order light) does not fall within the objective numerical aperture. Light 751 that hits the dirt residuals 705, however, is diffracted, and at least a portion of diffracted light 756 falls within the objective numerical aperture. Thus, in the dark-field imaging system 700, a dark background corresponds to clean portions of surface 305 and bright areas correspond to portions of surface 305 that have dirt residuals 705. One advantage of a dark-field imaging system 700 is that it provides a high contrast image from a glass sample with residue ("dirty glass").

In one embodiment, $\alpha_c$ is the angle between the peripheral ray of the illumination beam PR and the line T set by the objective aperture and the field of view (FOV) as shown in FIG. 7A. In one embodiment, $5° < \alpha_c < 15°$.

In practice, reaching such small $\alpha_c$ values requires a deviation of the illumination beam near the objective aperture. This can be achieved either with a mirror 760 or an optical element designed to provide total internal reflection such as a prism (see FIGS. 7B & 7C). Several other configurations are also possible. For instance, the light source may be placed closer to the tracking surface than the lens, and a mirror may be used to direct the light onto the surface.

In one embodiment, the illumination beam is focused with an average angle $\theta = \alpha_c/2$. In one embodiment, the illumination beam is focused with an angle $\theta$ ranging from $\alpha_c/2$-30% to $\alpha_c/2$-30%. A slight focusing angle is beneficial for several reasons, including the following: Switching from dark-field to bright-field imaging is better controlled. As illustrated in FIG. 7A, the distance $\Delta x$ is smaller than for a collimated beam—this makes the system more robust. Further, the critical angle $\alpha_c$, which varies across the FOV (T1 and T2 correspond to two different objective collection angles), can be kept nearly constant ($\alpha_{c1} \approx \alpha_{c2}$) as illustrated in FIG. 7A. With a collimated beam, generally, $\alpha_{c2} \ll \alpha_{c1}$. Moreover, compliance with eye safety norms can be ensured with a larger optical power if a small focusing angle is used.

Figure 8A:
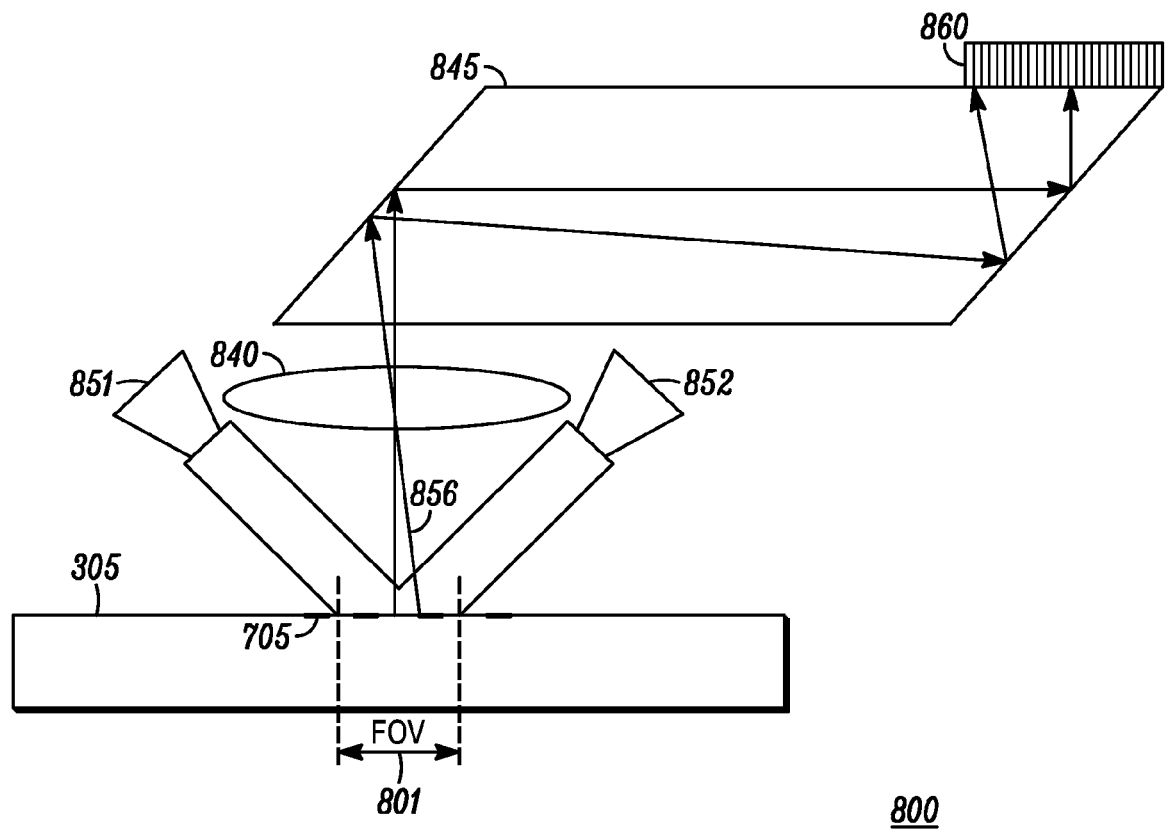
FIG. 8A illustrates one embodiment of a dark-field imaging system for use in an optical input device, in accordance with the present invention.

FIG. 8A illustrates one embodiment of a dark-field imaging system 800 for use in an optical input device 110, in accordance with the present invention. In the example shown in FIG. 8A, the dark-field imaging system 800 includes two light sources 851, 852. Typically, light sources 851, 852 are LEDs, for example, conventional red LEDs, blue LEDs, laser diodes, or the like.

Figure 8B:
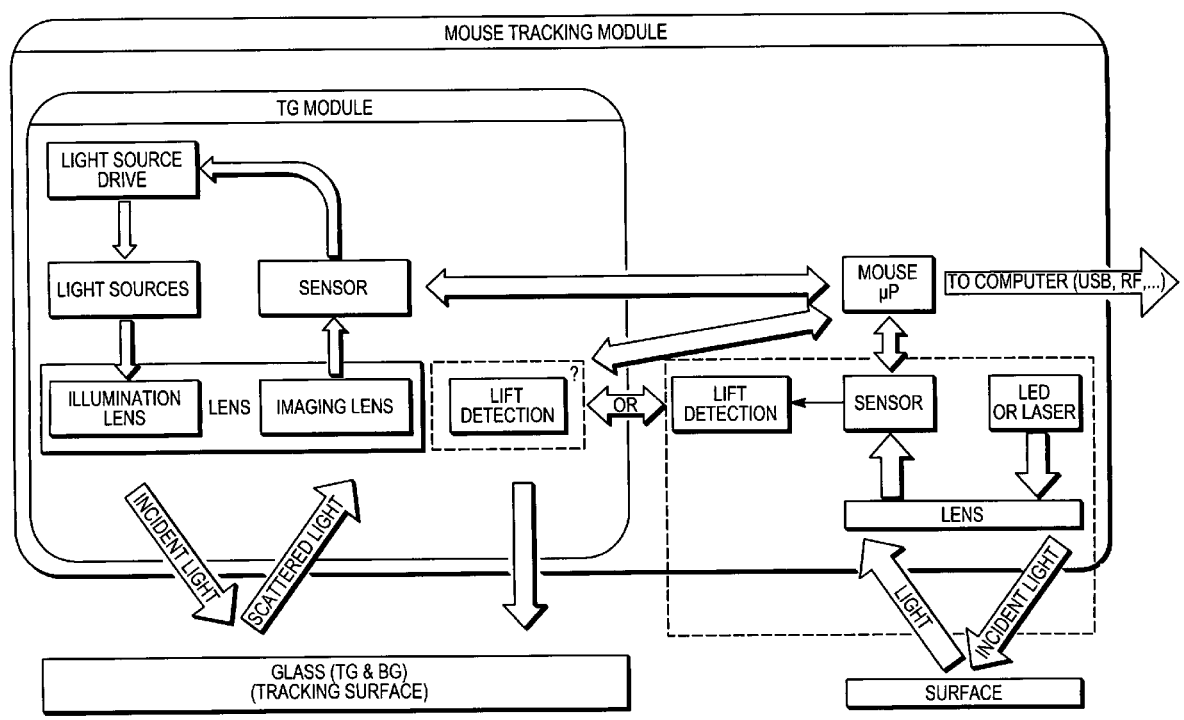
FIG. 8B illustrates a device in accordance with an embodiment of the present invention, with a sub-system for tracking on a transparent surface, and another sub-system for tracking on a regular surface.
Figure 8C:
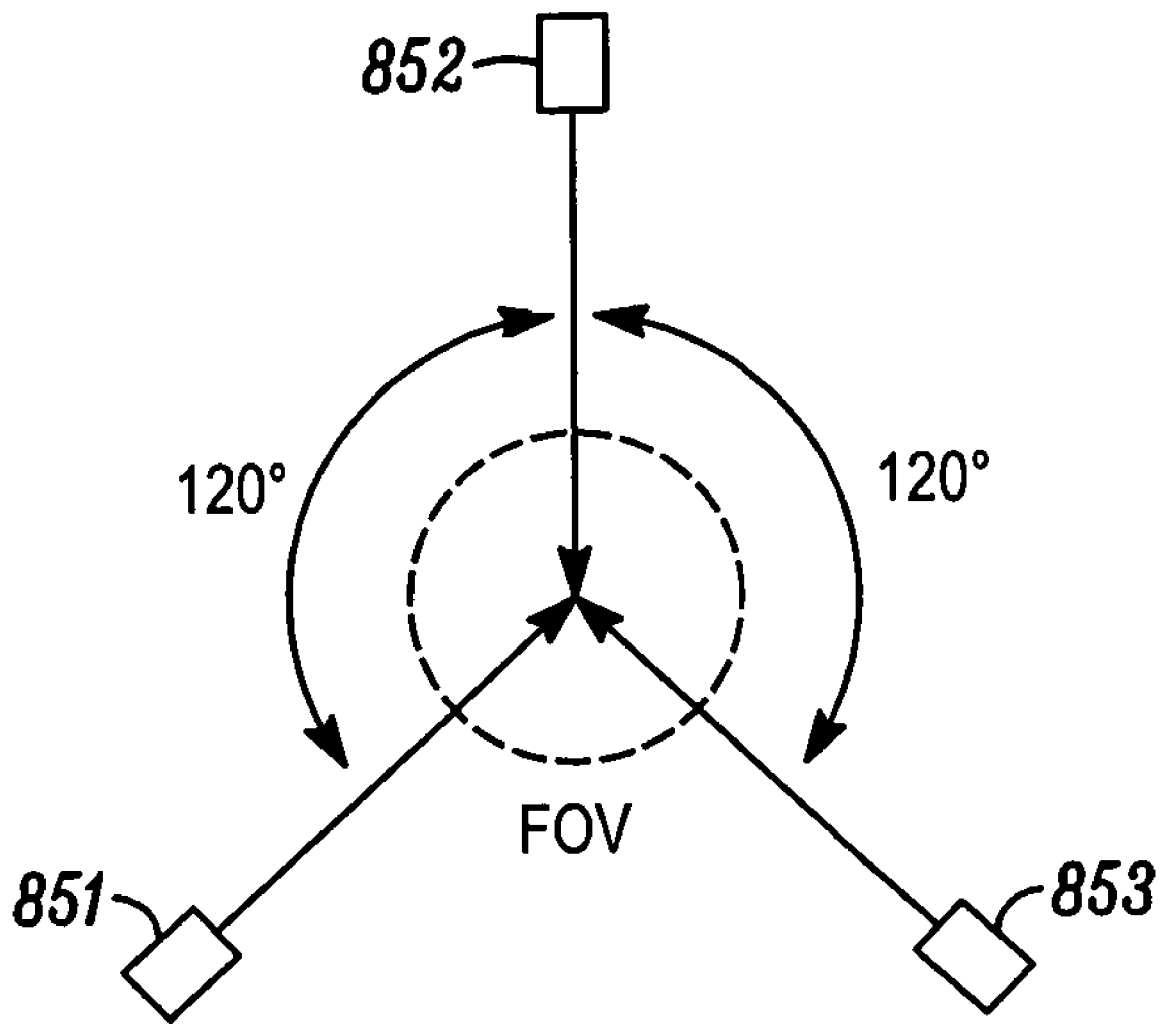
FIG. 8C illustrates an arrangement of light sources of a dark-field imaging system, in accordance with an embodiment of the present invention.

In one embodiment, a dark-field imaging system in accordance with an embodiment of the present invention includes N light sources, for example VCSELs, disposed around the field of view at approximately equal distances from the field of view and equal distance from each other. In one embodiment, light sources 851, 852, 853 are LEDs, for example, conventional red LEDs. In one embodiment, light sources 851, 852 and 853 are laser diodes, such as VCSELs or the like. FIG. 8C shows three light sources 851, 852, 853 arranged in such a manner, but any reasonable number of light sources 851, 852, 853 can be used. In one embodiment, the number of light sources ranges from 2 to 6 light sources.

Referring back to FIG. 8A, at least some diffracted light 856 from the dirt residuals 705 on surface 305 passes through an imaging lens 840 to prism 845 and eventually to a detector array 860. Detector array 880 can include any type of sensor known in the art or described above. In one embodiment, sensors in detector array 880 are CMOS sensors that link to circuitry (not shown) for performing conventional imaging processing or digital signal processing.

Sensor Subsystem of the Dark-Field Optical System

In one embodiment, two parameters of the imaging subsystem strongly influence the design of the dark-field imaging system 800. Detection of dirt residuals on relatively clean glass, for example, requires a relatively large field of view (FOV) 801 and a relatively high numerical aperture. For example, in one embodiment the FOV exceeds 1 mm in diameter and the numerical aperture is at least in the range of 0.3-0.4. Note that given a large FOV together with a high numerical aperture, a high resolution is possible which by principle requires a large number of pixels. Also note that a high numerical aperture yields a limited depth of field, for example approximately 6 microns for a numerical aperture value of 0.4. Hence, the dark-field imaging system 800 can be extremely sensitive to defocus.

An advantage of certain embodiments of the present invention is that they overcome these constraints by intentional spatial undersampling of an image. For relatively clean glass, for example, only a few bright spots are expected, and only one bright spot is needed for tracking. For relatively dirty glass, for example, only a few dark spots are expected, and only one dark spot is needed for tracking. For instance, in the case of a very dirty glass, a clean area (appearing black) creates a relevant tracking item. Thus, in either situation, it is unnecessary to obtain a high resolution image of the spot for tracking purposes. In addition, spatial undersampling of the image minimizes the amount of information to be processed and decreases the sensitivity of the system 800 to defocus due to z-distance variations due to vertical vibrations or wear on the part of the optical input device in contact with the transparent material 315 (e.g., feet 310). For example, in one embodiment, a magnification factor of 4 and a pixel size of 20 microns are used for spatial sampling. Alternatively or additionally, defocus can be addressed by modifying the shape and/or position of the optical elements in the imaging subsystem using the techniques described in the sections above.

Also note, in one embodiment, to limit spherical aberrations, the focal length (f) of the objective lens 840 is approximately five times the field of view 801. As an example, the field of view 801 is approximately 1 mm and thus, focal length (f) is approximately 5 mm. The optical path behind the imaging lens 840, which is the product of the focal length times the magnification factor, is therefore on the order of 20 mm. Hence, the optical path behind the imaging lens 840 is on the order of 20 mm. To fit a dark-field imaging system 800 with these parameters into a compact form factor, the optical path from the imaging lens 840 to the detector array 860 can be folded, as shown in FIG. 8A. To further reduce the optical path, free air propagation can be replaced by propagation in a piece of material with a higher index of refraction, such as in a prism 845. In this particular case a long image distance (lens to sensor) helps to create speckles of bigger size (also proportional to the aperture). It is to be noted that on a regular (i.e. optically rough) surface, in a dark field configuration using a laser, the sensor will track on speckles or imaged spots (ex: printed text).

It is to be noted that a device in accordance with one embodiment of the present invention has multiple sensors. As can be seen in FIG. 8B, one sensor is used to measure optical displacement when the device is used on a transparent or translucent surface. In one embodiment, this sensor is part of a dark-field imaging sub-system. The other sensor is part of the conventional imaging sub-system, and is used to measure optical displacement when the device is used on an optically rough surface. In one embodiment, multiple light sources are used. In one embodiment, each light source provides light to a different sensor. In one embodiment, a controller is used to determine which sub-system is to be used at any given time. In one embodiment, a user may be able to select which sub-system to use. A lift detection module is part of one or both sub-systems in accordance with other embodiments of the present invention.

Illumination Subsystem of the Dark-Field Optical System

In one embodiment, in order for the dark-field optical system 800 to function optimally, the field of view 801 should be adequately illuminated. For example, system 800 is designed so that illumination of at least 1 mW in strength is used to illuminate the field of view 801. In one embodiment, the system 800 is designed with the goal of exciting as many diffraction orders as possible by using a large range of vertical and radial illumination angles while preventing a reflected zero order from falling within the numerical aperture of lens 840. Many configurations of the illumination subsystem are possible, but for illustration purposes, three exemplary systems that are capable of meeting these design features are described below.

Non-uniform radial illumination. In one embodiment, N spatially incoherent light sources, for example LEDs, are disposed around the field of view 801 at approximately equal distances from the field of view 801 and equal distance from each other. FIG. 8C shows three light sources 851, 852, 853 arranged in such a manner, but any reasonable number of light sources 851, 852, 853 can be used. In one embodiment, the number of light sources ranges from 2 to 6 light sources. Note that provided that the light sources have a narrow emitting angle, for example less than 20 degrees, no focusing lens is required. In one embodiment, light from light sources 851, 852, 853 is collimated to provide a more uniform illumination of surface 305. In one embodiment, the illumination is realized with 3 laser sources (VCSELs) 851, 852, 853 making 120° angles relative to each other in a plane parallel to the glass surface. In an alternate embodiment, 2 lasers with perpendicular illumination directions can be used.

Figure 8D:
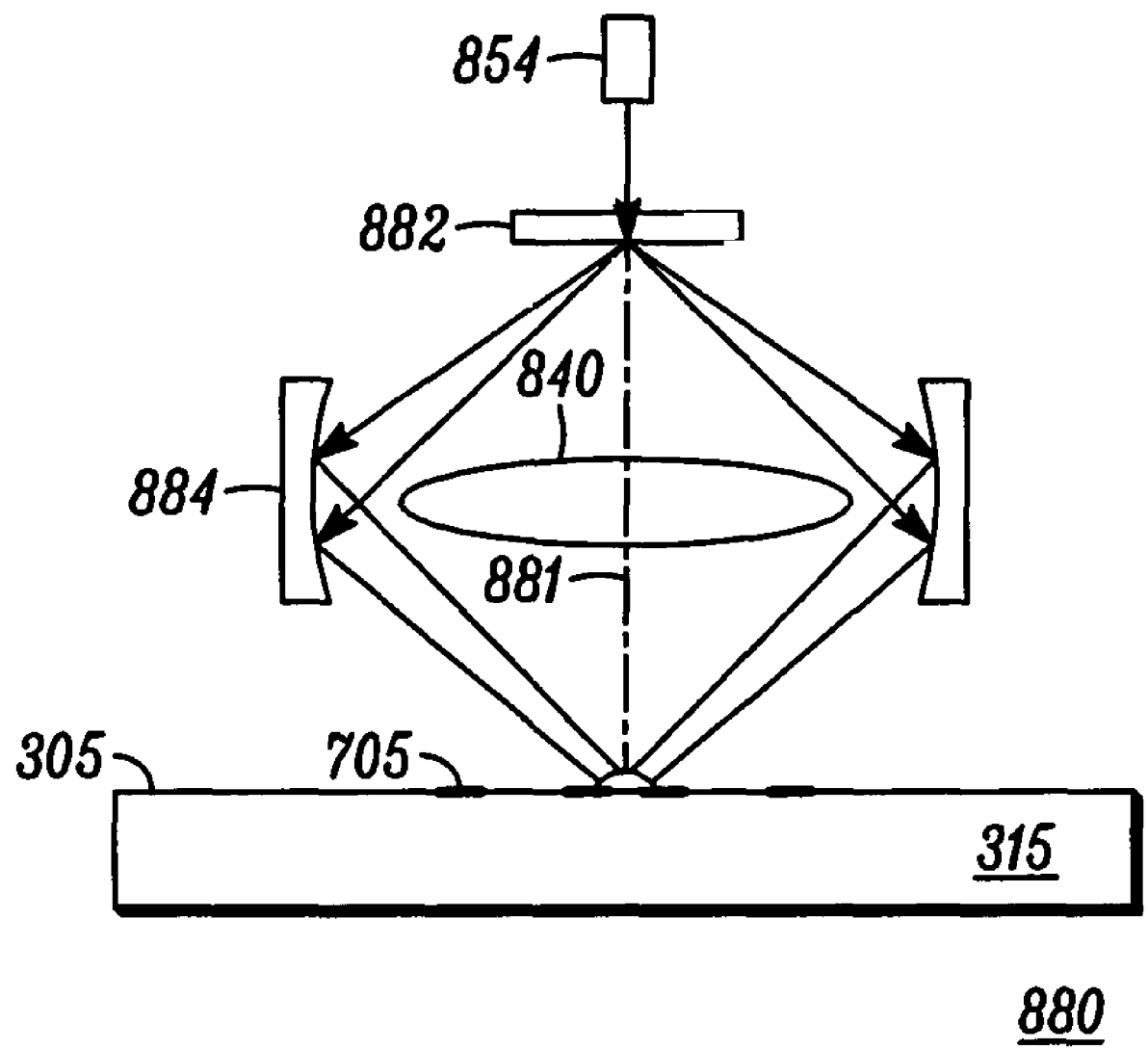
FIG. 8D illustrates a radial illumination system of a dark-field imaging system in accordance with one embodiment of the present invention.

Uniform radial illumination. In another embodiment, uniform radial illumination can be attained by using a laser diode 854 in combination with a diffractive optical element ("DOE") 882. FIG. 8C illustrates one embodiment of a radial illumination system 880 of a dark-field imaging system that uses a laser 854 and a DOE 882. One advantage of the radial illumination system 880 shown in FIG. 8D is that only one light source is needed for a uniform radial illumination. The system is symmetrical around the optical axis 881. The DOE 882 may contain or be followed by a diffuser to increase the diversity of vertical illumination angles falling on a single point of the surface 305 of the transparent material 315. For example, the DOE 882 may include a holographic diffuser. Depending on the size and arrangement of the components, a beamsplitter (not shown) may be used to separate the illumination system from the imaging detection system. The beamsplitter can be located between the lens 840 and the DOE 882.

Illumination from a controlled annular emitting angle. In another embodiment, an LED with a controlled annular emitting angle, for example, can be used for illumination. Alternatively, a Bragg grating or other means to produce an emitting profile that prevents a zero order reflection from falling within the numerical aperture of the imaging lens 840. A microcavity LED or resonant cavity LED ("RCLED") can provide an annular illumination profile similar to the one obtained with a laser and a DOE as discussed above with reference to FIG. 8D. As mentioned above, an advantage of this method is the use a single light source for a uniform radial illumination.

Interferometric Detection System

Figure 9A:
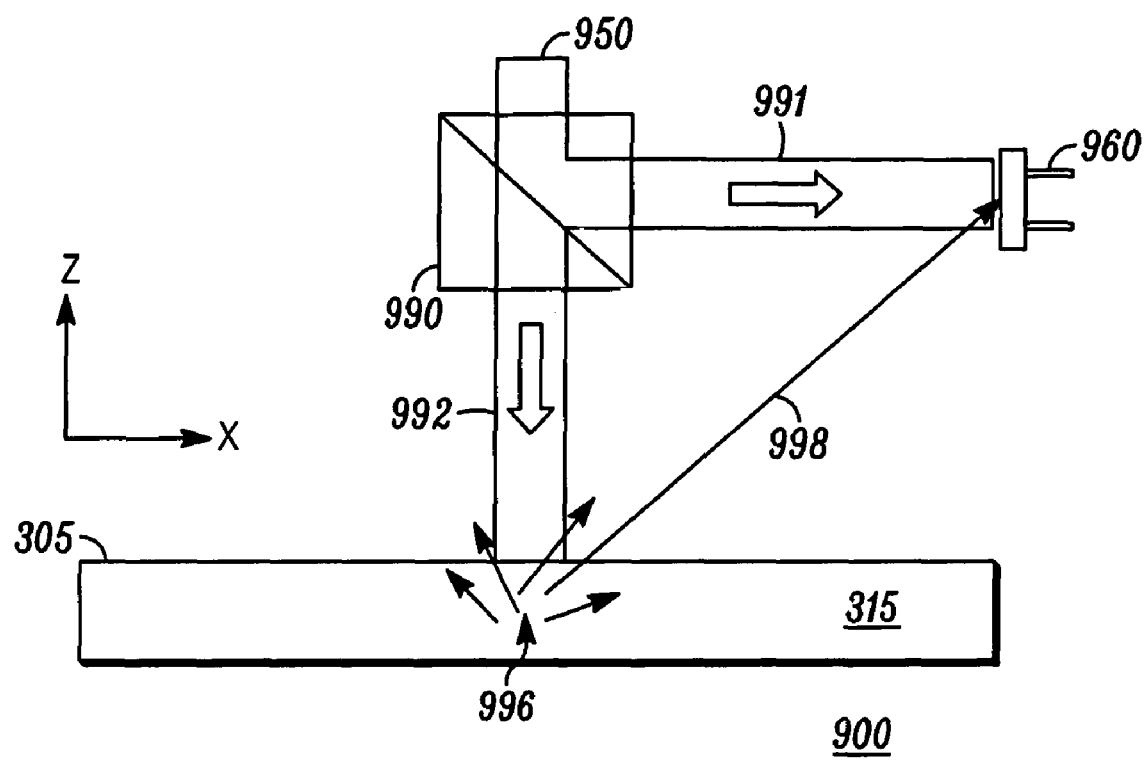
FIG. 9A illustrates an interferometric detection system for optical tracking on a transparent or translucent surface, in accordance with one embodiment of the present invention.

FIG. 9A illustrates one embodiment of an interferometric detection system 900 for optical tracking on a transparent or translucent surface for measurements along the x-axis, in accordance with the present invention. A duplicate system can be used for measurements along the y-axis. In addition, a very similar system could also be used to measure displacement along the z-axis (e.g., lift detection). Light 950 passes through beamsplitter 990 so that light 950 is split into two parts. One light beam 991, referred to as the reference beam 991, is directed to detector 960 and the other light beam 992 is directed to the transparent or translucent layer 315. Alternatively, beamsplitter 990 can be replaced by a diffraction grating or other device that splits the light into at least two parts.

In one embodiment, light beam 992 is Rayleigh scattered 996 by transparent layer 315 as shown in FIG. 9A. A portion of the Rayleigh scattering 996 is backscattered 998 and is collected by detector 960. Thus, the reference beam 991 with a constant frequency is recombined with backscattered light 998 with a frequency that has been Doppler shifted according to the speed of a relative movement between the light source and the surface 305. The sum of the two interfering light beams 991, 998 generates a wave-beat frequency that can be measured to detect the speed of relative motion and detect the amount of time over which that relative motion occurs in order to determine the amount of displacement.

In one embodiment, the wave-beat frequency is approximately in the 10 kHz range for optical mice applications. In addition, in one embodiment, accelerometers can be used to determine the direction of displacement. Further, in one embodiment, one accelerometer can be used for the x-direction and a second accelerometer can be used for the y-direction.

In one embodiment, the design of the sensor subsystem of the interferometric detection system can result in the system being shot noise limited. However, the operation of the interferometric detection system 900 is still dependent on detector 960 receiving enough backscattered light 998 to register a signal. Rayleigh scattering intensity is inversely proportional to the fourth power of the wavelength. Thus, an order of magnitude higher Rayleigh scattering intensity can be gained by using light 950 of a shorter wavelength, for example blue (approximately 480 nm) rather than infrared (850 nm). Even a weak signal from backscattered light 998 can be amplified using homodyne amplification, as discussed, for example, in B. E. A. Saleh and M. C. Teich, *Fundamentals of Photonics*, Wiley, New York, 1991, the relevant portions of which are incorporated herein by reference.

Figure 9B:
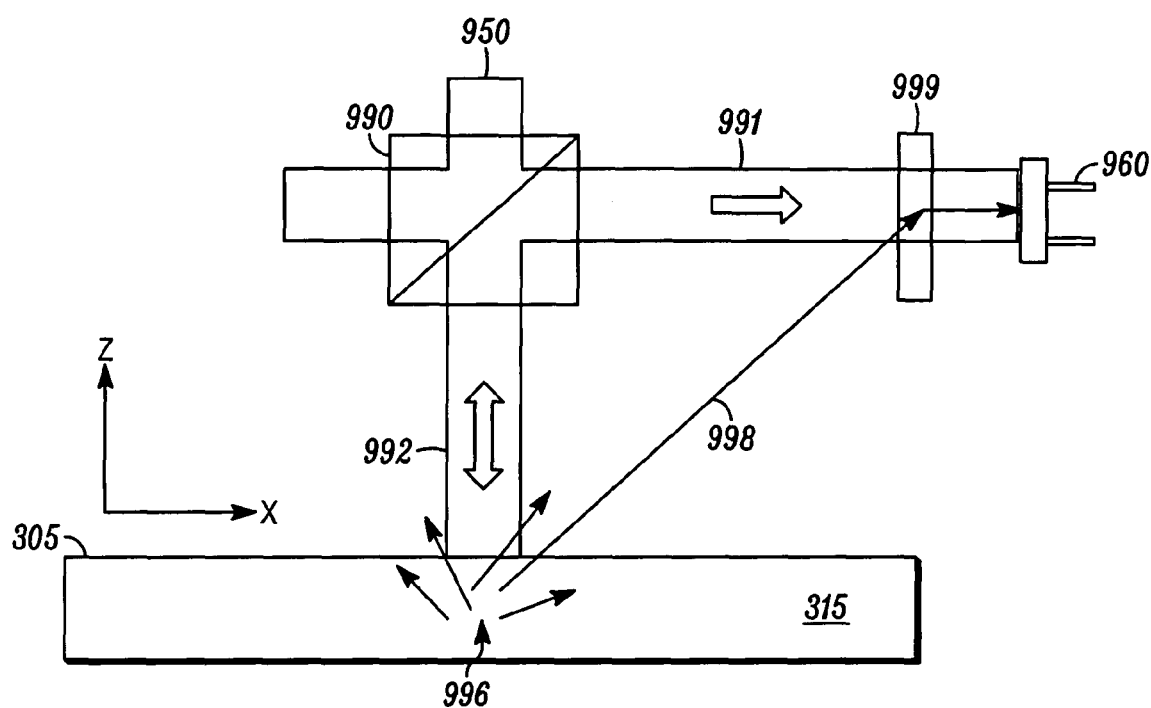
FIG. 9B illustrates an interferometric detection system for optical tracking on a transparent or translucent surface including a diffraction grating in accordance with an embodiment of the present invention.

In some embodiments, a Doppler shift along the z-axis mistakenly could be detected as a displacement along the x and/or y axis. FIG. 9B illustrates one embodiment of an interferometric detection system 900 for optical tracking on a transparent or translucent surface 305 that compensates for z-displacements, the system including a diffraction grating 999, in accordance with the present invention. In this embodiment, the reference light (light reflected from the surface 305) is reflected at 90 degrees, and the reference light 991 is directed through a transmission diffraction grating 999 (that in one embodiment does not deviate the beam) to a detector 960. The backscattered light 998 illuminates the grating 999 at a given mean angle between 30 degrees and 60 degrees. In one embodiment, a lens (not shown) is placed in front of the grating 999 to collect more Rayleigh backscattered light 998. In one embodiment, the grating 999 deviates the Rayleigh backscattered light 998 in a direction perpendicular to the surface 305 of the transparent or translucent material 315. Thus, the reference beam 991 and the backscattered beam 998 propagate in the same direction between the diffraction grating 999 and the detector 960.

To accurately detect displacement in the z axis, the light reflected from the surface of the transparent material can be used as the reference wave 991. Doppler shift results form the compression or dilation of a wave along its direction of propagation. When the surface 305 moves both laterally and vertically relative to the measurement device, the reference beam is sensitive only to z-displacements while the backscattered light is sensitive to both x- and z-displacements. In this case, the same Doppler shift is experienced along the vertical axis for both the reflected and Rayleigh backscattered light. Because both the reference beam 991 and the backscattered beam 998 experience the same Doppler shift in the z-direction, the wave beat frequency received by the detector 960 is sensitive only to x-displacements. The beat frequency, which is equal to the difference of frequency between two waves, is null for z-displacements. Thus, the system is configurable to compensate for z displacements. However, using the light reflected from the surface 305 as the reference beam 991 can reduce the homodyne amplification effect due to the lower reflection at the air/glass interface (4% if the illumination is perpendicular to the interface) relative to the 50% which can be obtained, e.g., with a beamsplitter as in FIG. 9A.

Figure 10:
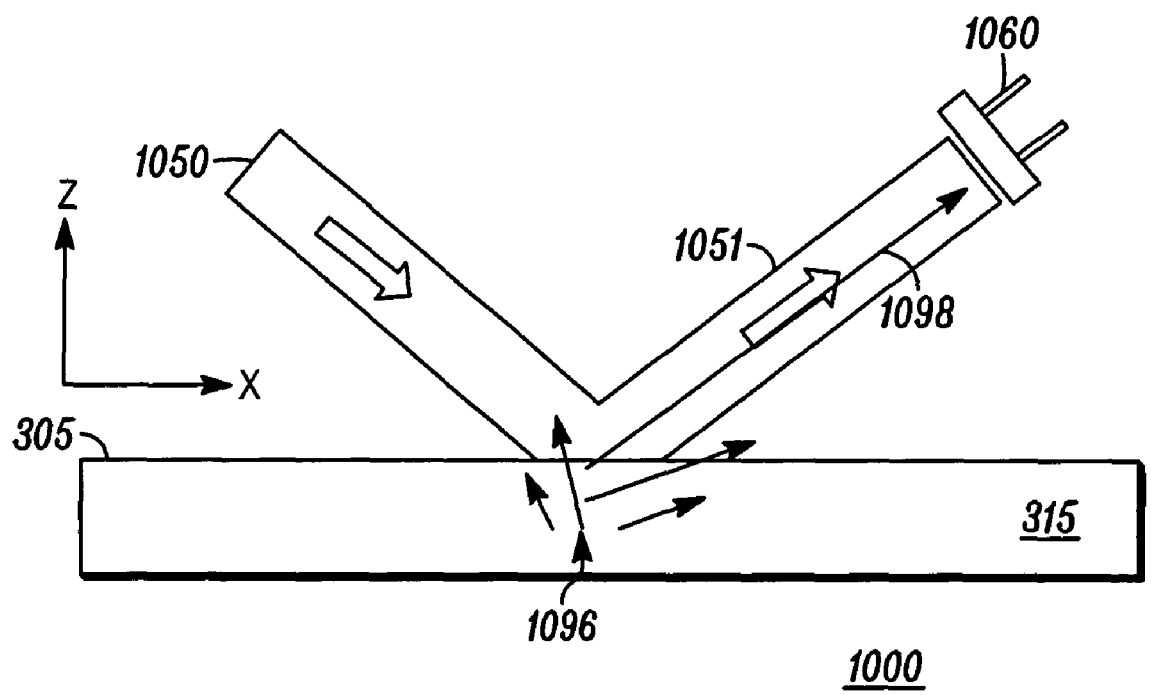
FIG. 10 illustrates one embodiment of an interferometric detection system that uses reflected light from the surface of a transparent or translucent material as a reference beam, in accordance with the present invention.

Alternatively, to increase the reference signal power and avoid the use of a beamsplitter, a configuration of the interferometric detection system such as that shown in FIG. 10 can be used. FIG. 10 illustrates one embodiment of an interferometric detection system 1000 that uses reflected light 1051 from the surface 305 of a transparent or translucent material 315 as a reference beam, in accordance with the present invention. In this example, light 1050 is polarized in a direction parallel to surface 305 and used at a lower illumination angle. According to the Fresnel laws, four times more light is reflected at an angle of 60 degrees from the perpendicular axis to the surface 305 as compared to perpendicular illumination. Thus, the amount of light 1050 that reflects 1051 off of surface 305 and becomes incident on detector 1060 is increased by combining the effects of polarization and illumination angle. In addition, the interference signal is improved because the reference beam of reflected light 1051 and the backscattered light 1098 propagate in the same direction. Moreover, a configuration such as that shown in FIG. 10 obviates the need for a beamsplitter, thus increasing the simplicity and compactness of the design.

Figure 11:
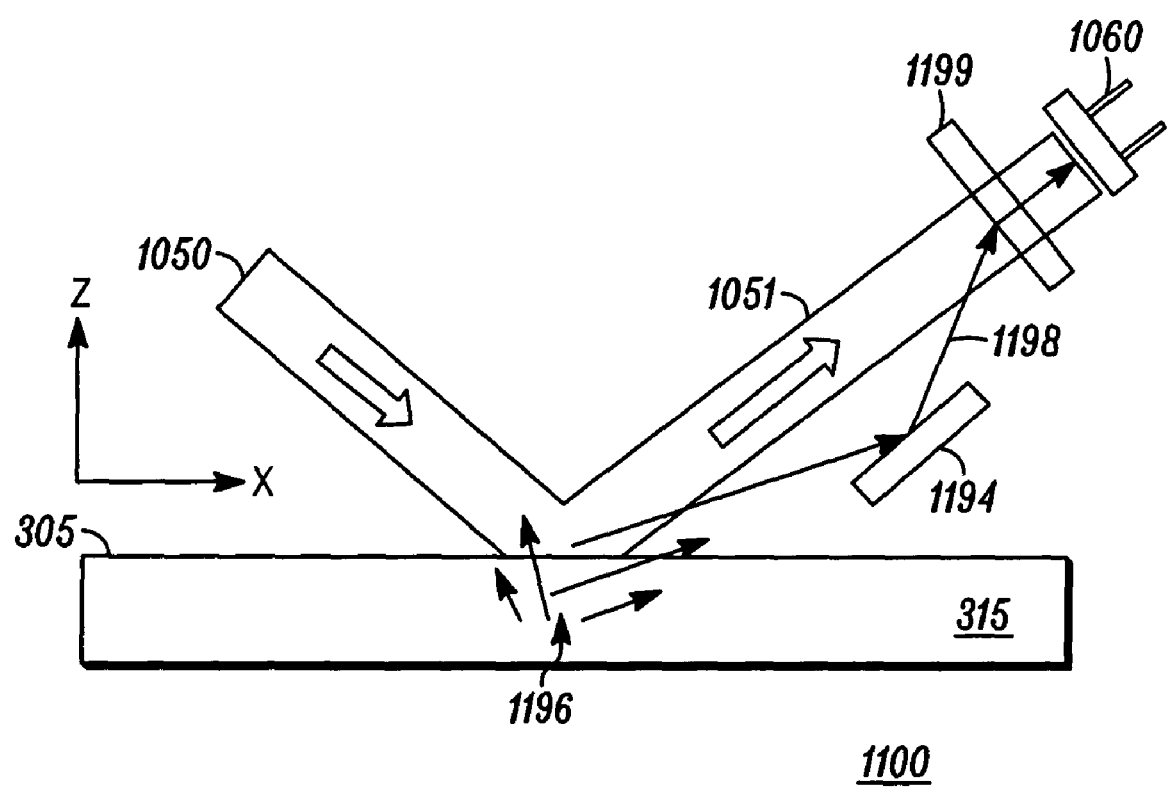
FIG. 11 illustrates one embodiment of an interferometric detection system with two light sources and two detectors for detecting displacement along one axis.

FIG. 11 illustrates another embodiment of an interferometric detection system 1100 that uses reflected light 1051 from the surface 305 of a transparent or translucent material 315 as a reference beam, in accordance with the present invention. As shown in FIG. 11, a Doppler shift creates a change of direction of the Rayleigh backscattered light 1198. Thus, backscattered light 1198 is collected at a different angle relative to the surface 305 when the interferometric detection system 1100 is moved relative to the surface 305 in the x-direction. A mirror 1194 is used to direct the Rayleigh backscattered light 1198 to a diffraction grating 1199 that is used to recombine the backscattered light 1198 with the reference light 1051. As previously described with reference to FIG. 9B, the diffraction grating deviates the Rayleigh backscattered light beam 1198 so that it propagates in the same direction as the reflected light beam 1051 between diffraction grating 1199 and detector 1060.

Figure 12A:
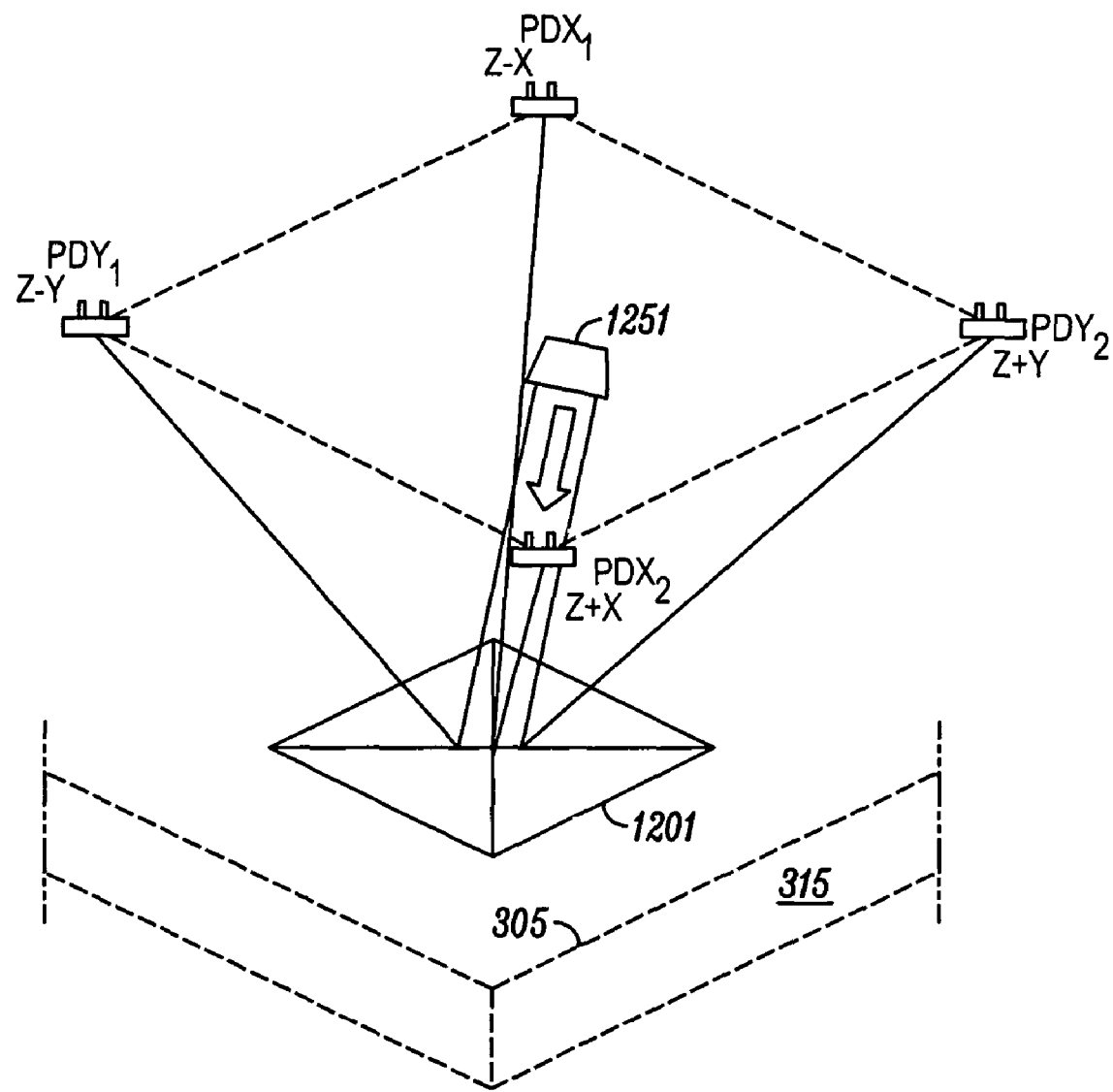
FIG. 12A is an illustration of one embodiment of an interferometric detection system with one light source, in accordance with the present invention.
Figure 12B:
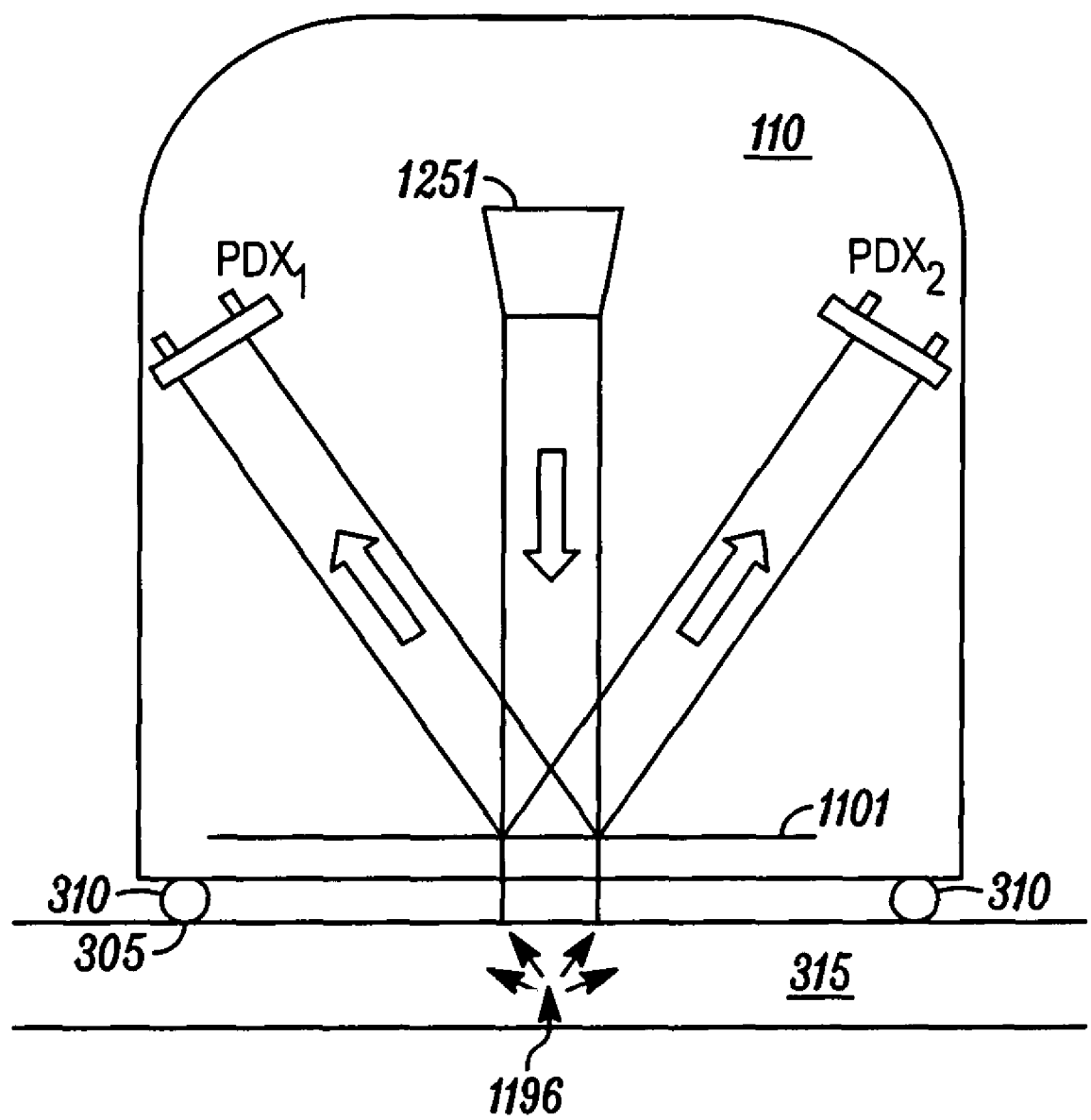
FIG. 12B is an illustration of a cross section of the embodiment of an interferometric detection system illustrated in FIG. 12A inside of an optical input device.

FIG. 12A is an illustration of one embodiment of an interferometric detection system with one light source 1251 and four detectors $PDX_1$, $PDX_2$, $PDY_1$, $PDY_2$, in accordance with the present invention. In one embodiment, light propagating from light source 1251 is collimated and propagates toward grating 1201. A portion of the light diffracted from the grating 1201 falls on each of the four detectors $PDX_1$, $PDX_2$, $PDY_1$, $PDY_2$. In addition, a portion of the light propagating from light source 1251 passes through grating 1201 to transparent layer 315, where it is subject to Rayleigh scattering (not shown in this figure). A portion of the Rayleigh scattered light is superimposed on the diffracted light from grating 1201 that falls on each of the four detectors $PDX_1$, $PDX_2$, $PDY_1$, $PDY_2$. Detectors $PDX_1$, $PDX_2$, $PDY_1$, $PDY_2$ are arranged, for example, as shown in FIG. 12A so that two detectors $PDX_1$, $PDX_2$ lie on the x-axis for detecting x displacement and two detectors $PDY_1$, $PDY_2$ lie on the y-axis for detecting y displacement. FIG. 12B is an illustration of a cross section of the embodiment of an interferometric detection system illustrated in FIG. 12A inside of an optical input device. For ease of discussion, FIG. 12B includes only the two detectors $PDX_1$, $PDX_2$ that lie on the x-axis for detecting x displacement.

Referring back to FIG. 12A, $PDX_1$ and $PDX_2$ will receive signals corresponding to the combination of the displacement in the x-direction and the z-direction. In the illustrated embodiment, the sign of the displacement along the x-axis determined by the signal received by $PDX_1$ will be opposite the sign of the displacement along the x-axis determined by the signal received by $PDX_2$. For ease of discussion, the signal received by $PDX_1$ will be referred to representing as the combination of the displacement in the negative x-direction and the z-direction whereas the signal received by $PDX_2$ will be referred to representing as the combination of the displacement in the positive x-direction and the z-direction. $PDY_1$ and $PDY_2$ will receive signals corresponding to the combination of the displacement in the y-direction and in the z-direction. In the illustrated embodiment, the sign of the displacement along the y-axis determined by the signal received by $PDY_1$ will be opposite the sign of the displacement along the y-axis determined by the signal received by $PDY_2$. Again, for ease of discussion, the signal received by $PDY_1$ will be referred to as representing the combination of the displacement in the negative y-direction and the z-direction whereas the signal received by $PDY_2$ will be referred to as representing the combination of the displacement in the positive y-direction and in the z-direction.

In addition to the configurations described above, in some embodiments accelerometers can be used to detect the direction of displacement. One of ordinary skill in the art will recognize that signal processing based on counting the oscillations in the Doppler signal or applying frequency analysis (e.g., FFT) can be used to determine the value of x displacement and/or the value of z displacement from the signals received by detectors $PDX_1$, $PDX_2$. Similarly, the value of y displacement and/or the value of z displacement can be determined from the signals received by detectors $PDY_1$, $PDY_2$.

Figure 13:
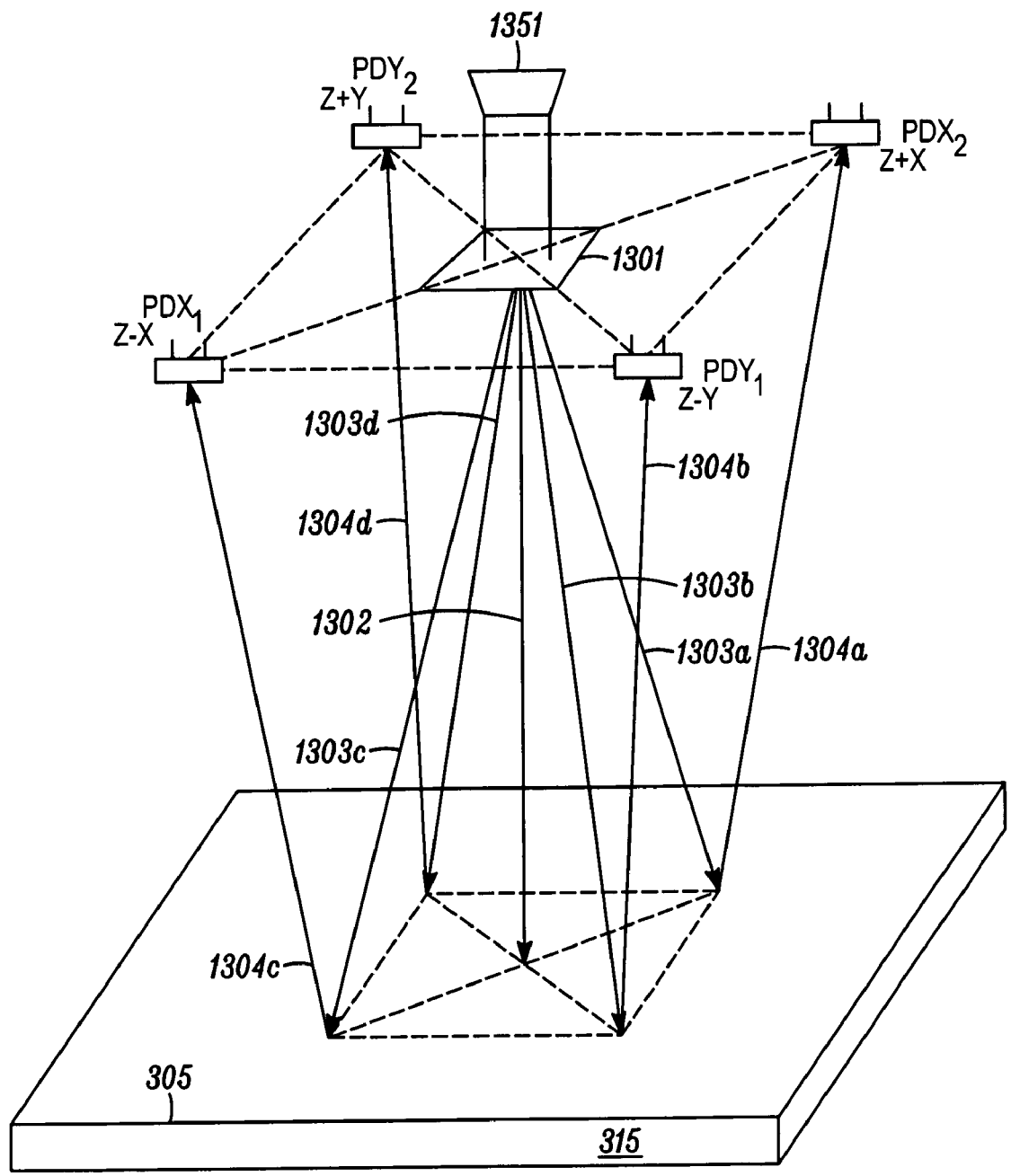
FIG. 13 is an illustration of one embodiment of an interferometric detection system with a transparent grating, in accordance with the present invention.

FIG. 13 is an illustration of one embodiment of an interferometric detection system 1300 with a transparent grating 1301, in accordance with the present invention. In the example shown in FIG. 13, the interferometric detection system 1300 comprises a light source 1351, a transparent grating 1301, and four detectors $PDX_1$, $PDX_2$, $PDY_1$, $PDY_2$. In one embodiment, light propagating from light source 1351 is collimated and propagates toward transparent grating 1301. A portion of the light from light source 1351, the zero order, diffracts along path 1302. A portion of the light from light source 1351, the first order, diffracts along paths 1303a, 1303b, 1303c, 1303d (generally 1303) and interacts with transparent layer 315. Upon intersecting transparent layer 315, a portion of the light reflects off of the surface 305 of the transparent layer along paths 1304a, 1304b, 1304c, 1304d (generally 1304) respectively. In addition, a portion of the light that travels along paths 1303 penetrates transparent layer 315 and is Rayleigh scattered along paths 1304 respectively to detectors $PDX_1$, $PDX_2$, $PDY_1$, $PDY_2$. Detectors $PDX_1$, $PDX_2$, $PDY_1$, $PDY_2$ are positioned to receive the reflections of the light from surface 305 when the optical input device 110 is resting on the surface 305. Thus, as described above, the light collected by detectors $PDX_1$, $PDX_2$, $PDY_1$, $PDY_2$ represents a mixture of light propagating along paths 1303 that is reflected from the surface 305 and the light that is Rayleigh scattered along paths 1304. From the signals received by detectors $PDX_1$, $PDX_2$, $PDY_1$, $PDY_2$ the displacement in the x-, y-, and z-directions can be detected as described above with reference to FIG. 12A.

Creating Features for Dark-Field Imaging:

I) System Based on Droplet Deposition Combined with Dark-Field:

A) Principle:

In one embodiment, the deposition of water droplets on a glass surface can provide a good reference for tracking on the glass surface. A conventional LED or laser illumination system may create sufficient contrast. Alternatively the latter can be significantly improved with dark-field illumination and/or the presence of chemical substances in the water droplets (or spread on the glass surface). The combination of fluid droplets deposition with dark-field imaging appears thus to be a very promising modality for glass tracking.

Figure 14:
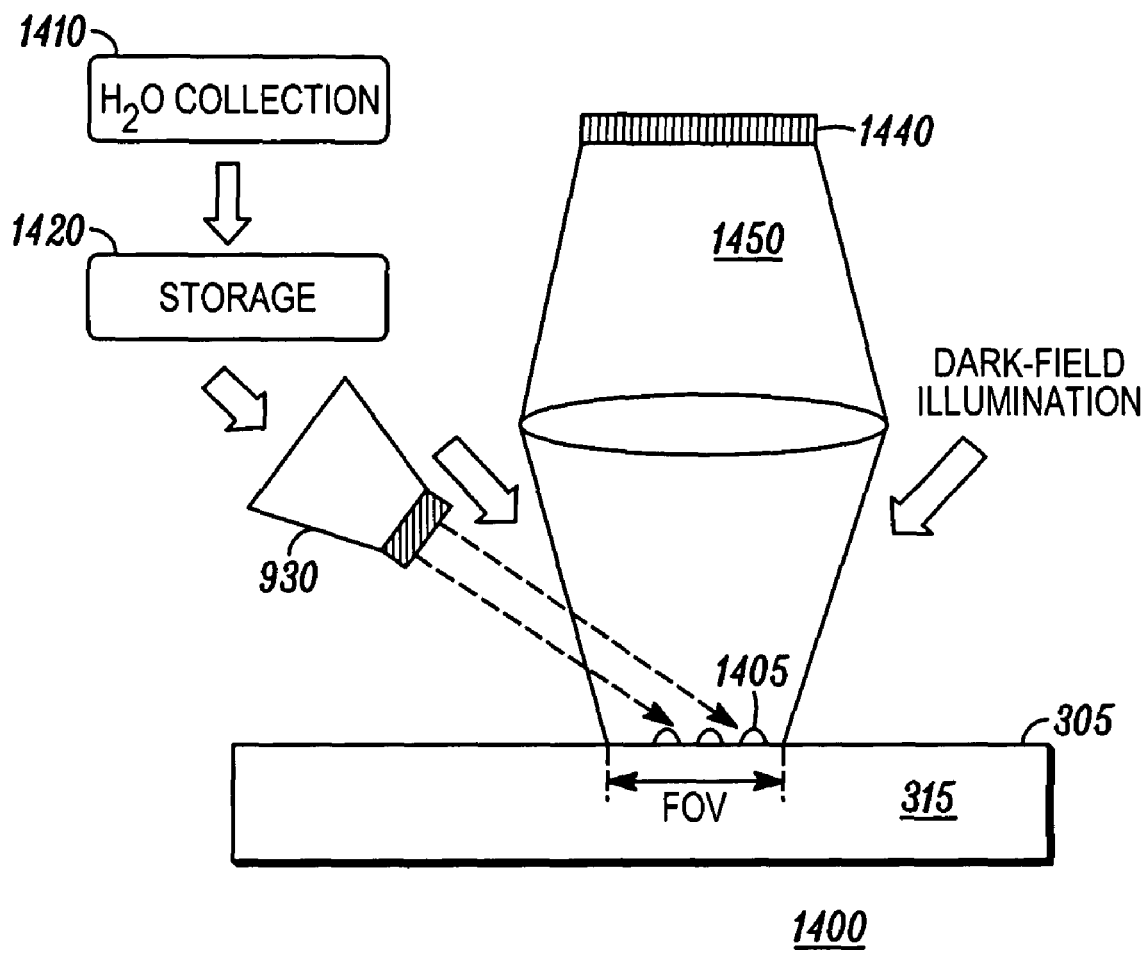
FIG. 14 illustrates an embodiment of a mouse with a tracking system based on droplet deposition combined with dark-field imaging.

A water marking system has several advantages. The transparent or translucent surface does not appear dirty, and the liquid becomes invisible due to natural evaporation. It is to be noted that other suitable fluids could also be used in place of water. However, droplets deposition at short intervals requires, in one embodiment, an efficient ejection system as well as a storage tank. The key elements and functions of such a tracking system 1400 are shown in FIG. 14.

The basic functions and related elements present in the system are described hereafter.

B) Collection

Due to the fluid consumption, the system requires a collection tank 1410 which may have to be regularly filled or replaced. Various solutions are possible, such as:

Passive filling: In one embodiment, the tank consists of a disposable cartridge which is replaced when empty. Alternatively a permanent tank is filled with fluid contained in a cartridge.

Figure 15:
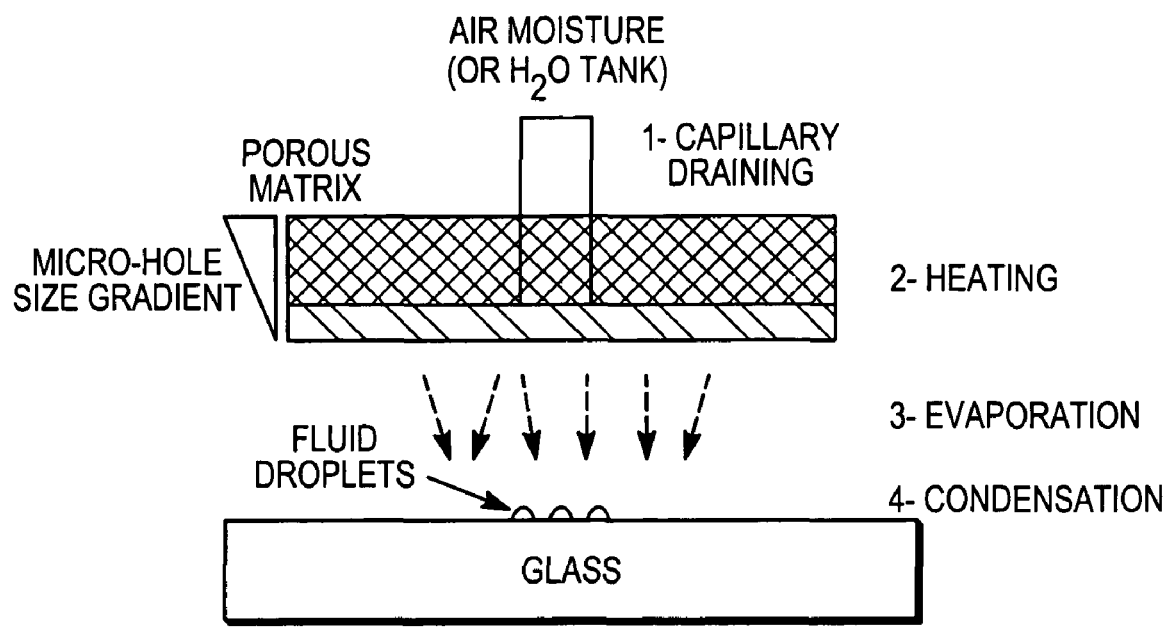
FIG. 15 illustrates an embodiment of a mouse with a tracking system based on droplet deposition, where a capillary system is used for water collection.

Active filling: In one embodiment, moisture is collected and delivered to the tank during mouse use. This can be achieved by a Peltier cooling system. The latter can induce condensation of moisture contained in the surrounding air. Capillary forces could be used to drain the condensed water within the tank. FIG. 15 illustrates one way in which capillary forces could be obtained, with a porous matrix made of holes with gradually varying sizes.

Semi-active filling: In one embodiment, the moisture collection system is active only when connected to an external power supply when the mouse is not in use. In one embodiment, the power supply may be obtained e.g. by connecting the mouse to a USB port (Plug & fill). In another embodiment, a cradle (e.g., mouse docking station) is used for providing the power supply for the moisture collection system (Peltier element). In yet another embodiment, a cradle/docking station is used for directly filling the fluid tank. For example, the cradle contains a tank and a valve so as to control the fluid delivery.

C) Storage

In one embodiment, the expected fluid volume to be stored ranges between 0.5 to 5 $cm^3$. Due to the limited space available in a mouse, in one embodiment, the storage tank 1420 made of a flexible material so as to fit around the other mouse inner components. For instance, in one embodiment, the tank consists of a flexible flask made of silicone.

D) Ejection

The droplets may be ejected in various ways. For instance:

In one embodiment, the volume of the ejection chamber 1430 is monitored with a piezoelectric element as in an inkjet head. In another embodiment, the volume of the ejection chamber is monitored with a thermal system. Such systems allow controlling the droplets size (to a certain extent), as well as the number and deposition pattern. In one embodiment, the ejection device 1430 contains a few holes depending on the droplet configuration used (see section F below).

In one embodiment, a porous matrix is heated (e.g. with electrical current) so as evaporate the fluid and leave natural condensation create a random droplet pattern on the glass surface (See FIG. 15).

E) Detection

To maximize the contrast between the droplets and the glass surface background, a dark-field illumination system described above is used in some embodiments of the present invention. In one embodiment, the control of some of the droplet properties (see section G below) could be used in addition to dark-field imaging. In another embodiment, the control of some of the droplet properties (see section G below) could be used as an alternative to dark-field imaging.

F) Tracking

Tracking can be achieved by depositing a single droplet or a cluster of droplets 1405 in the field of view (FOV) of the imaging system. The pressure based ejection system described above allows controlling the size, shape, number and configuration of the droplets 1405. In one embodiment, the droplets 1405 have a hemispherical shape (meniscus due to water surface tension) with diameter D at the surface ranging between 10-100 microns. The smaller D is, the more difficult the detection (due to small size and short evaporation time), but the lower the fluid consumption.

Several droplet configurations could be used. In one embodiment, a single droplet is deposited in the middle of the field of view. In another embodiment, a regular pattern of droplets is deposited at known distant relative to each other, e.g., in an isometric triangular arrangement, or in a hexagonal arrangement. In yet another embodiment, a random droplets pattern (such as obtain e.g. with a system based on evaporation and condensation) is deposited. Furthermore, in one embodiment, the physical properties of the droplets can be controlled to a certain extend as described in section G below. In one embodiment, the interval between each series of droplets deposition is set by the evaporation time. In another embodiment, this interval is set based upon the time to reach the field of view boundary (i.e. depends on mouse speed and FOV size). In yet another embodiment, this interval is set by a combination of such factors.

G) Control of the Droplets Properties

In one embodiment, in order to facilitate tracking, some of the droplets properties can be controlled to a certain extent so as to improve detection and increase evaporation time. In one embodiment, a chemical substance can be spread on the glass surface (e.g., with an impregnated dust cloth). In other embodiment, a chemical substance is diluted in the droplets' fluid.

Additives such as surfactant can change the surface tension of the droplets, and in turn modify the droplets meniscus (i.e. radius of curvature and angle relative to the surface) and evaporation time. The control of the meniscus shape can greatly facilitate detection with dark-field imaging due to a larger collection of backscattered light. Moreover, a hydrophobic layer on the glass surface can significantly slow the evaporation time. This provides more time for detection and reduces fluid consumption. In one embodiment, chemical agents with fluorescent properties (typically excited in the UV) or visible only in the NIR are added. Some materials which can be used to modify the droplets properties and facilitate their detection are discussed further in the next section.

II) Pattern Deposition on Glass Prior to Mouse Use

In one embodiment, a pattern—invisible for a human observer—is spread (e.g., with a dust cloth or spray) on the glass surface prior to mouse use. A contrasted pattern is then detectable in the UV, NIR (e.g. absorption or transmission pattern) or in the visible spectrum if fluorescent material is utilized.

Examples of materials which can be used include hydrocarbons, oil, grease, polymers, soap, fluorescent molecules, etc. A few examples are provided hereafter. In the hydrocarbons, grease category, Molybdenum disulfide grease (MoS2) gives good results for tracking under both visible (640 nm) and IR (850 nm) illumination with standard mouse sensors. MoS2 grease is very common for gears and bearings lubrication and is therefore low cost. Molybdenum disulfide (MoS2) particles improve the quality of the tracking. The glass surface also appears less dirty than with human hand grease for example.

In another embodiment, an invisible (to the naked eye) dye fluorescing under UV lighting can be used to mark the glass surface with a detectable and recognizable pattern (fluorescent ink). The UV excitation is performed, in one embodiment, with a UV LED (e.g., 375 nm). Fluorescent emitted light can be in the visible or NIR band. In one embodiment, standard Fluorescein ($C20 H12 O5$) is used. Alternatively, some UV invisible stamp inks are permanent on glass and can be florescent in the blue band, green band or red band (617 nm).

In yet another embodiment, an IR fluorescent ink is used. Such inks have typically a simulation (absorption) peak wavelength of 793 nm and an emission (fluorescent) wavelength of 840 nm. Both absorption and emission can be used to generate a contrast for tracking:

Absorption: the IR fluorescent ink can be stimulated with a 720-740 nm IR LED. Dark spots will appear on the sensor image where the ink absorbs the light.

Emission: the IR fluorescent ink can be stimulated with a 720-740 nm IR LED or a red side emitting laser diode. The sensor requires a 830 nm filter to detected the fluorescent emitted light.

III. Dirt Spreading

Another embodiment for tracking on glass/other transparent or translucent surfaces is described below.

For a mouse in accordance with an embodiment of the present invention, the mouse body contains a polymer ring—possibly with a few openings—surrounding the imaging field of view (the ring-like element can be seen as a series of mouse feet in contact with each others or closely spaced). This surrounding element is in contact with the glass surface so as to spread dirt residuals already present on the glass surface. This reduces the risk of having clean areas on the glass surface, on which a dark-field system would not be able to track. In some embodiments, the dirt spreading element is located in, on, or around the feet of a mouse.

In various embodiments, the dirt spreader is made of various materials such as foam, polymer, micro airbrush, Teflon skater, etc. Further, the shape, texture etc. of the dirt spreader varies in different embodiments. For instance, the dirt spreader can be circular, segmented, and so on.

In addition, in one embodiment, a mouse in accordance with an embodiment of the present invention may contain one or more elements to provide additional dirt. In one embodiment, such an element would be similar to the end of a soft ink pen containing a greasy fluid or any other material marking the surface.

It is to be noted that the techniques described above can be used in conjunction with dark-field imaging described above.

IV. Thermal Spot Tracking:

In one embodiment, a hot spot 1605 is created on the transparent surface 305 with a focused laser beam 1607 and then imaged on an IR detector array 1610 to serve as a reference for tracking. In one embodiment, a new hot spot is created either when the hot spot is about to fall outside the field of view defined by the array size, or when the hot spot temperature falls below a detection threshold $\Delta T_0$ (relative to the ambient temperature).

Figure 16:
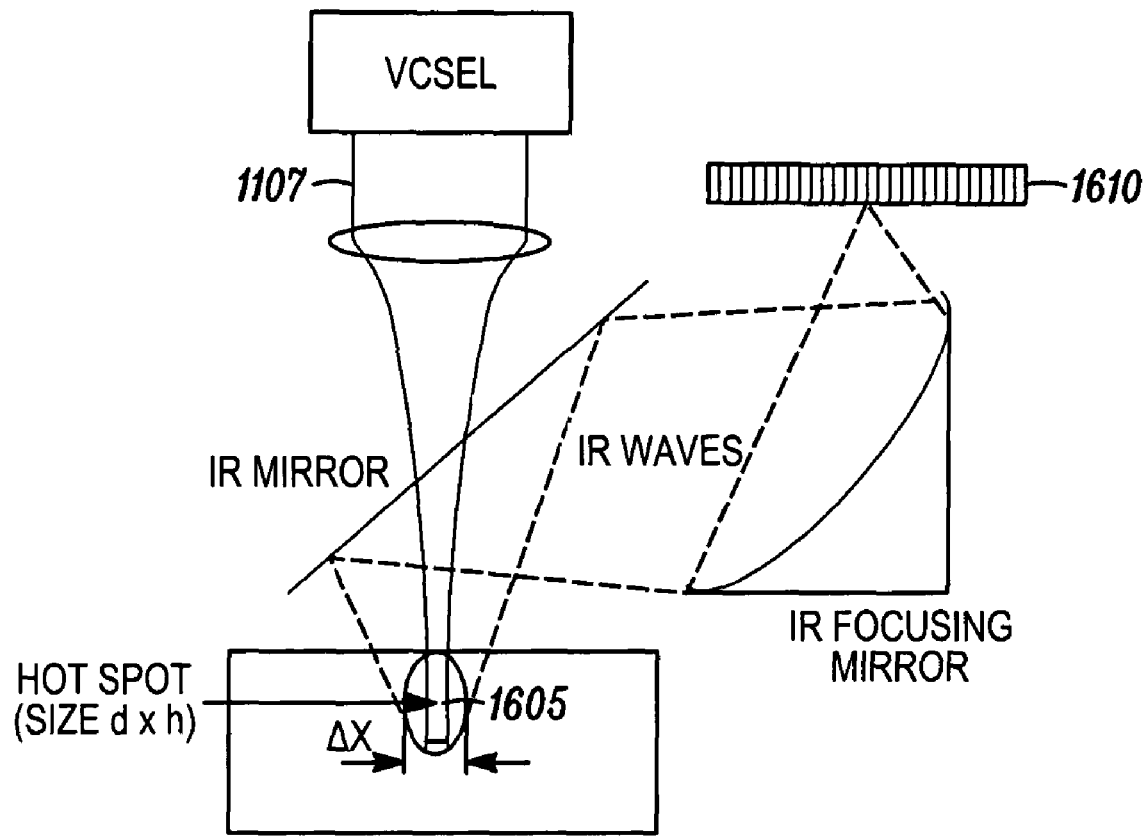
FIG. 16 illustrates an example of a configuration for thermal spot tracking.

A possible configuration for thermal spot tracking is illustrated in FIG. 16. In one embodiment, reflective optics is used to avoid Germanium lenses which may otherwise be needed in the IR above the glass transmission range (5 µm).

Some physical considerations and system requirements for the implementation of such a tracking principle in accordance with one embodiment of the present invention are listed here below:

The light source is powerful enough to create a detectable hot spot.

The light source power complies with the eye safety norms.

The heating time $t_h$ is enough to allow sufficient heating and to provide the spatial location of the hot spot during mouse displacement.

The hot spot cooling time constant is long enough to maintain a temperature above a detection threshold $\Delta T_0$ during a time interval $t_i$ until the creation of a new spot.

The time spend per pixel—determined by the number of pixels N×N, the spatial resolution $\Delta x$ and the maximal mouse velocity (0.5 m/s)—is long enough to have a sufficient Signal to Noise Ratio (SNR).

Figure 17:
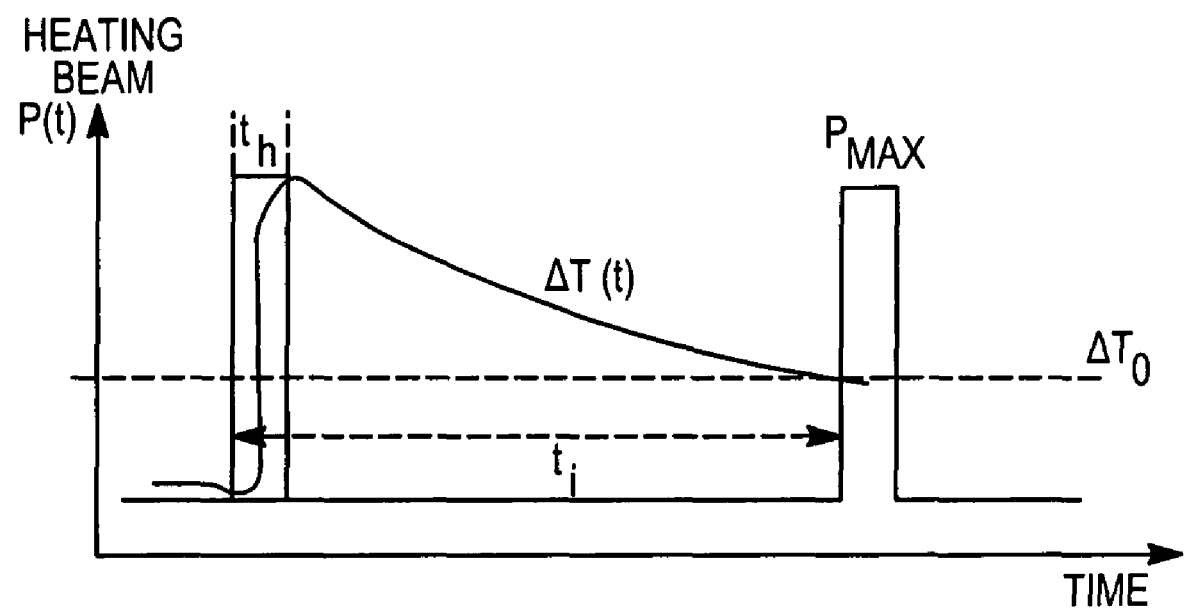
FIG. 17 illustrates some parameters and values involved in hot spot creation and cooling.

FIG. 17 illustrates a graph of heating versus time. Some of the important parameters involved in the hot spot creation and cooling are shown in FIG. 17. The values used/obtained in one embodiment are given below:

$t_h$=10 µs
$t_i$=1 ms
$P_{max}$=100 mW
$P_{mean}$=1 mW
Heating energy $E_h$=1 µJ
N×N=$50^2$ pixels
$\Delta x$=20 µm (resol=pixel size with G=1)
d=10 µm
h=50 µm
Magnification factor G=1

In one embodiment, the glass is heated with a source emitting at wavelengths in the glass absorption spectral range, i.e. in the UV or IR above 5 µm. Examples of IR range sources are cascade lasers manufactured by the company AlpLaser. In one embodiment, the glass is heated with a source emitting in the glass transmission spectral range at available wavelengths (e.g. VCSEL in the visible or NIR).

In one embodiment, a temperature difference of at least 10° C. is needed for successful tracking.

Figure 18:
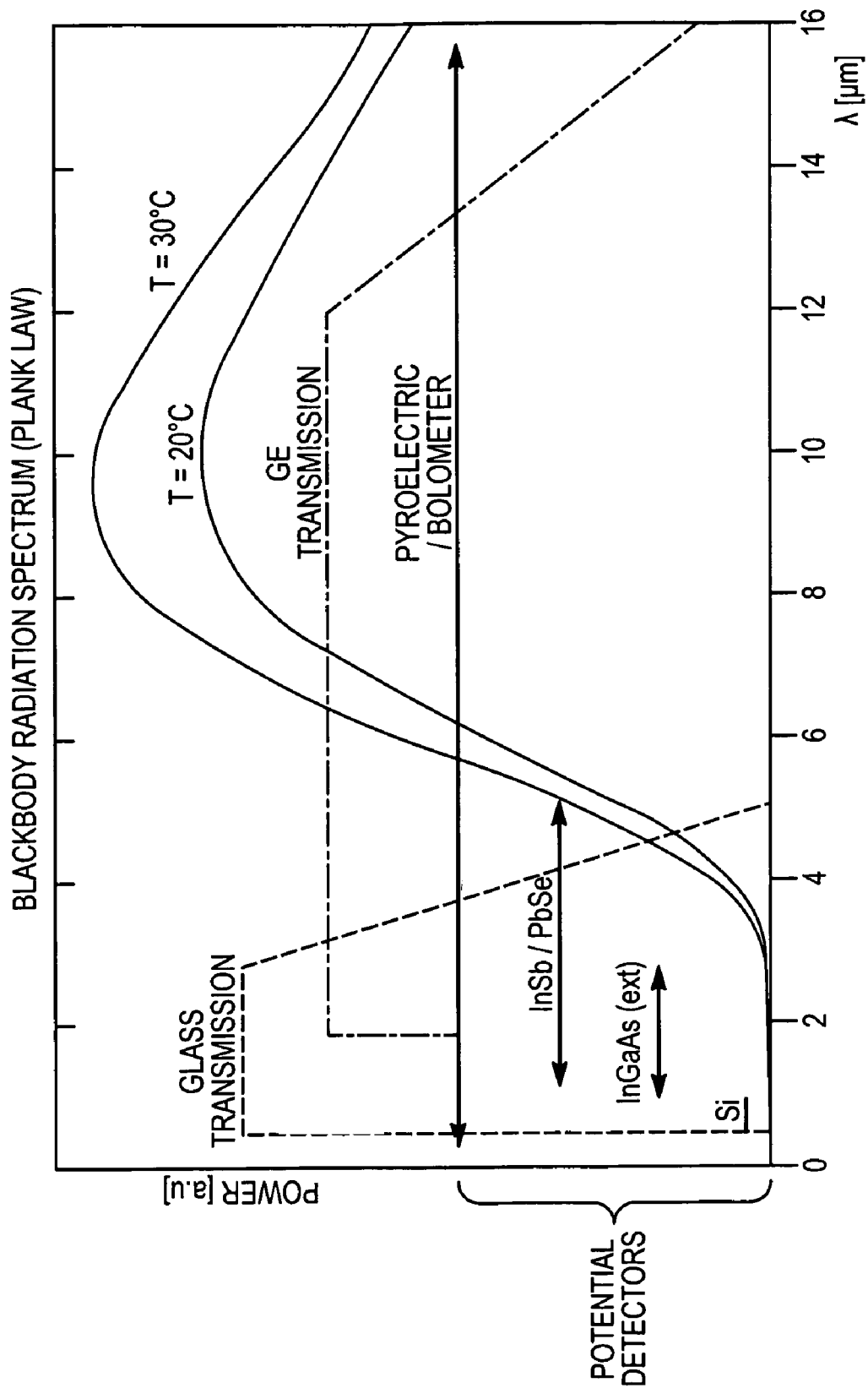
FIG. 18 illustrates the parameters and values involved in hot spot creation and cooling in one embodiment of the present invention.

FIG. 18 shows the blackbody radiation spectral emission curves for T=293 K (20° C.) and T+$\Delta T_0$ (10° C.) as well as the wavelength transmission or detection ranges of various materials.

In some embodiments, with moderate cooling which could be achieved for example with a Peltier element, detectors such as HgCdZnTe or PbSe are used. In other embodiments, pyroelectric detectors are used. Analogous to piezoelectric materials in which mechanical stress generates electrical polarization, pyroelectric materials are sensitive to temperature difference. However, in pyroelectric materials ions move in the modified crystal lattice till reaching equilibrium and the voltage difference disappears. Thus, the pyroelectric detectors are sensitive only to temperature variations i.e. to AC signals. Generally they are used with mechanical choppers or amplitude modulated sources.

Examples of the causes of temperature variations include:

for fast mouse displacements, the energy variation when moving from one pixel to a another.

for slow mouse displacements (or no displacements), the energy variation created by the duty cycle of the VCSEL source (emission during $t_h$ at regular interval $t_i$)

In one embodiment, a 2D pyroelectric detector array is used.

It is to be noted that the various techniques described for tracking on glass (or other transparent or translucent surfaces) can be used alone, or in combination with one or more other techniques. For instance, droplets deposited on a glass surface can be used either with a conventional illumination system, or with dark-field imaging. Further, the control of the fluid properties, for contrast enhancement can also be used with either a conventional illumination system or a dark-field imaging system. Furthermore, in one embodiment, a "smart system" is used, which switches from one of these modalities to another, or to a combination of such modalities. For instance, dark-field tracking alone may be used on dirty glass (tracking dirt residuals) alone, while droplet deposition/surface wiping may be performed only when dark-field alone does not provide enough contrast. Such switching may be activated either manually or automatically.

With the sources and configurations described above, it is to be noted that, in one embodiment, a system in accordance with an embodiment of the present invention will be in either of the two imaging modes depending on the environmental conditions:

When there is no material below glass, tracking is performed on images of dirty features on the glass surface.

When there is scattering material below glass yielding a background signal larger than obtained with (i), tracking is performed on the speckles created by the background signal in the imaging plane (i.e. at the glass surface)

From the above description, it will be apparent that the embodiments disclosed herein provide a novel and advantageous system and method for sensing in an optical device.

The foregoing discussion discloses and describes merely exemplary methods and embodiments. As will be understood by those familiar with the art, the invention may be embodied in other specific forms without departing from the spirit or essential characteristics thereof. For example, the embodiments discussed may be applied to other domains and environments, and may be employed in connection with additional applications where optical sensing is desirable. Accordingly, the disclosure is intended to be illustrative, but not limiting, of the scope of the invention.

What is claimed is:

1. A dark-field optical displacement detection system for use in an optical input device capable of tracking motion of the optical input device relative to a glass surface, a top of the glass surface having features thereon, the dark-field optical displacement detection system comprising:
    an illumination subsystem comprising a light source for illuminating the glass surface;
    a lens positioned to collect at least some diffracted light from the features on the top of the glass surface, but not the zero order light reflected from the glass surface, wherein the features are not sufficient to enable tracking movement of the optical input device using conventional methods used for optically rough surfaces; and
    a detector optically coupled to the lens to receive the at least some diffracted light wherein the dark-field optical displacement detection system tracks motion relative to the top of the glass surface, and not relative to an optically rough surface underneath the glass surface.

2. The dark-field optical system of claim 1, wherein the illumination subsystem comprises N light sources.

3. The dark-field optical system of claim 2, wherein the N light sources are spatially incoherent.

4. The dark-field optical system of claim 1, wherein the illumination subsystem comprises a laser diode and a diffractive optical element to provide a uniform radial illumination.

5. The dark-field optical system of claim 1, wherein the illumination subsystem comprises a diffractive optical element and a mirror to provide a uniform radial illumination.

6. The dark field optical system of claim 2, where the N light sources are equally spaced.

7. The dark-field optical system of claim 2, wherein one of the N light sources illuminates the glass surface at a first angle and a second of the N light sources illuminates the glass surface at a second angle.

8. The dark-field optical displacement detection system of claim 1, wherein the light source is coherent.

9. The dark-field optical displacement detection system of claim 1, wherein the features are dirt residue.

10. The dark-field optical displacement detection system of claim 1, wherein the features are droplets of a liquid.

11. An optical displacement detection system for use in an optical input device capable of tracking on a surface comprising a glass layer having features thereon, and a second layer of a material below the glass layer that scatters at least some light, the optical displacement detection system comprising:
    a coherent light source for illuminating the glass layer and the second layer by an illumination beam;
    a lens configured to collect at least some scattered light from the features on top of the glass layer, but not zero order light specularly reflected from the glass layer, and at least some scattered light from the second layer; and
    a detector optically coupled to the lens for receiving the at least some scattered light from the features on the glass layer and the at least some scattered light from the second layer, wherein the features are not sufficient to enable tracking movement of the optical input device using conventional methods used for optically rough surfaces, wherein the dark-field optical displacement detection system tracks motion relative to the top of the glass surface, and not relative to the second layer underneath the glass layer.

12. The optical displacement detection system of claim 11, further comprising:
    a second light source for illuminating the glass layer and the second layer.

13. The optical displacement detection system of claim 11, wherein the detector uses at least one of a first signal obtained from the glass layer and a second signal obtained from the second layer to detect displacement.

14. A method for optically detecting displacement on a glass surface and an optically rough surface at different times, the method comprising:
    at a first time, upon being placed on the glass surface, receiving a signal based upon at least some diffracted light from features on top of the glass a surface, but not zero order light specularly reflected from the glass surface, and detecting displacement relative to the top of the glass surface; and
    at a second time, upon being placed on the optically rough surface, receiving a signal based upon at least some scattered light from the optically rough surface, and detecting displacement relative to the optically rough surface.

15. The method of claim 14, further comprising:
    illuminating the glass surface at the first time and the optically rough surface at the second time, with a plurality of light sources.

16. The method of claim 14, further comprising:
    illuminating the glass surface at the first time and the optically rough surface at the second time, with a light source.

17. The method of claim 16, wherein the light source is coherent.

18. A method for optically detecting displacement on a surface comprising a first layer of a transparent material, and a second layer of a material below the first layer that scatters at least some light, the method comprising:
    illuminating the first layer and the second layer with a light source;
    receiving at least some scattered light from certain features on top of the first layer, but not zero order light specularly reflected from the first layer; and
    detecting displacement based on the received scattered light, wherein the optical input device tracks motion relative to the top of the first layer and not relative to the second layer.

* * * * *

UNITED STATES PATENT AND TRADEMARK OFFICE
CERTIFICATE OF CORRECTION

PATENT NO. : 7,898,524 B2
APPLICATION NO. : 11/471084
DATED : March 1, 2011
INVENTOR(S) : Olivier Theytaz et al.

It is certified that error appears in the above-identified patent and that said Letters Patent is hereby corrected as shown below:

Title page References Cited item (56) page 2, "Foreign Patent Documents", delete "WO 2004151927" and insert --JP2004151927--.

At column 3, line 41:
delete "embodiments," and insert --embodiments--.

At column 11, line 28:
delete "on" and insert --one--.

At column 14, line 16:
After "the" insert --specularly--.

At column 24, line 35:
delete "$t_i$)" and insert --$t_i$).--.

At column 25, line 24:
delete "surface)" and insert --surface).--.

At column 25, claim 1, line 26:
delete "light" and insert --light,--.

At column 25, claim 6, line 40:
delete "dark field" and insert --dark-field--.

At column 26, claim, 14, line 26:
delete "a" between glass and surface.

Signed and Sealed this
Nineteenth Day of July, 2011

David J. Kappos
*Director of the United States Patent and Trademark Office*